US012371262B2

(12) United States Patent
Qian et al.

(10) Patent No.: US 12,371,262 B2
(45) Date of Patent: Jul. 29, 2025

(54) CARRYING DEVICE, TRANSPORT ROBOT, INVENTORY METHOD, AND INVENTORY SYSTEM

(71) Applicants: DSC LOGISTICS (BEIJING) CO., LTD., Beijing (CN); HAI ROBOTICS CO., LTD., Guangdong (CN)

(72) Inventors: Jiale Qian, Beijing (CN); Xin Ai, Guangdong (CN); Chao Xie, Guangdong (CN); Qingxin Zhan, Guangdong (CN)

(73) Assignees: DSC LOGISTICS (BEIJING) CO., LTD., Beijing (CN); HAI ROBOTICS CO., LTD., Guangdong (CN)

( * ) Notice: Subject to any disclaimer, the term of this patent is extended or adjusted under 35 U.S.C. 154(b) by 659 days.

(21) Appl. No.: 17/664,112

(22) Filed: May 19, 2022

(65) Prior Publication Data
US 2022/0274779 A1    Sep. 1, 2022

Related U.S. Application Data

(63) Continuation of application No. PCT/CN2020/130104, filed on Nov. 19, 2020.

(30) Foreign Application Priority Data

Nov. 19, 2019 (CN) .......................... 201911135413.X
Nov. 19, 2019 (CN) .......................... 201911135461.9
Nov. 19, 2019 (CN) .......................... 201922006133.0

(51) Int. Cl.
*B65G 1/137*      (2006.01)
*B25J 9/16*       (2006.01)
(Continued)

(52) U.S. Cl.
CPC .............. *B65G 1/137* (2013.01); *B25J 9/162* (2013.01); *B65G 1/0435* (2013.01);
(Continued)

(58) Field of Classification Search
CPC .................. B65G 1/137; B65G 1/0435; B65G 2203/0258; B65G 1/1375; G06Q 10/087; B25J 9/162
See application file for complete search history.

(56) References Cited

U.S. PATENT DOCUMENTS 5,393,939 A * 2/1995 Nasuta, Jr. ........... G01G 19/005
                                                 177/210 R
2016/0304281 A1* 10/2016 Elazary .................... B25J 15/06
(Continued)

FOREIGN PATENT DOCUMENTS

CN    104108604 A    10/2014
CN    104860149 A    8/2015
(Continued)

OTHER PUBLICATIONS

CN-209023571-U (Year: 2019).*
International Search Report for PCT/CN2020/130104 mailed Feb. 24, 2021.

*Primary Examiner* — Ernesto A Suarez
*Assistant Examiner* — Laurence R Brothers
(74) *Attorney, Agent, or Firm* — Frank Gao, Esq.

(57) ABSTRACT

This application provides a carrying device, a transport robot, an inventory method, and an inventory system. The transport robot includes a carrying device. The carrying device includes: a bracket; a tray, mounted to the bracket and configured to place goods; a weight detection device, configured to detect a weight of the goods placed on the tray; and a retractable arm assembly, configured to push the goods placed on the tray out of the tray or pull the goods to the tray. Compared with the prior art, the weight detection device is (Continued)

arranged on the tray of the carrying device to detect the weight of the goods placed on the tray. The quantity of the goods may be determined according to the weight of the goods. Therefore, the low goods carrying efficiency due to manual goods inventory is avoided.

14 Claims, 11 Drawing Sheets

(51) Int. Cl.
  *B65G 1/04*    (2006.01)
  *G06Q 10/087*   (2023.01)

(52) U.S. Cl.
  CPC ......... *B65G 1/1375* (2013.01); *G06Q 10/087* (2013.01); *B65G 2203/0258* (2013.01)

(56) References Cited

U.S. PATENT DOCUMENTS

| | | |
|---|---|---|
| 2018/0005173 A1 | 1/2018 | Elazary et al. |
| 2018/0043547 A1* | 2/2018 | Hance .................... B25J 19/021 |
| 2019/0287051 A1* | 9/2019 | Heinla ................. G06Q 10/083 |

FOREIGN PATENT DOCUMENTS

| | | | |
|---|---|---|---|
| CN | 206798395 U | | 12/2017 |
| CN | 108830344 A | | 11/2018 |
| CN | 108891833 A | | 11/2018 |
| CN | 109035477 A | | 12/2018 |
| CN | 109154826 A | | 1/2019 |
| CN | 109230140 A | | 1/2019 |
| CN | 109264275 A | | 1/2019 |
| CN | 109670747 A | | 4/2019 |
| CN | 209023571 U | * | 6/2019 |
| CN | 209367031 U | | 9/2019 |
| CN | 110371560 A | | 10/2019 |
| CN | 211197466 U | | 8/2020 |
| CN | 211732688 U | | 10/2020 |
| JP | H02152803 A | | 6/1990 |
| JP | 2001233405 A | | 8/2001 |
| WO | 2015112665 A1 | | 7/2015 |
| WO | 2019095803 A1 | | 5/2019 |

* cited by examiner

CARRYING DEVICE, TRANSPORT ROBOT, INVENTORY METHOD, AND INVENTORY SYSTEM

CROSS-REFERENCE TO RELATED APPLICATIONS

This application claims priority to Chinese Patent Application No. 201911135461.9 entitled "INVENTORY METHOD BASED ON TRANSPORT ROBOT, TRANSPORT ROBOT, AND INVENTORY SYSTEM" and filed with the China National Intellectual Property Administration on Nov. 19, 2019, Chinese Patent Application No. 201922006133.0 entitled "CARRYING DEVICE AND TRANSPORT ROBOT HAVING THE CARRYING DEVICE" and filed with the China National Intellectual Property Administration on Nov. 19, 2019, and Chinese Patent Application No. 201911135413.X entitled "DAILY INVENTORY METHOD BASED ON TRANSPORT ROBOT, TRANSPORT ROBOT, AND INVENTORY SYSTEM" and filed with the China National Intellectual Property Administration on Nov. 19, 2019, which are incorporated herein by reference in their entireties.

TECHNICAL FIELD

The present disclosure relates to the field of intelligent warehousing, and in particular, to a carrying device, a transport robot, an inventory method, and an inventory system.

BACKGROUND

Intelligent warehousing is a part of a logistics process. The application of intelligent warehousing ensures quick and accurate data input in all parts of warehouse management. In this way, enterprises can learn real inventory data timely and accurately, thereby properly maintaining and controlling inventory of the enterprises. In addition, by means of scientific coding, batches and shelf lives of warehouse goods can be conveniently managed. Moreover, by means of a storage location management function in the SNHGES system, current locations of all warehouse goods can be learned timelier, thereby improving efficiency of the warehouse management.

In warehousing tasks, inventory task is of great significance. By regularly or temporarily checking the actual number of inventory items, you can know the profit and loss status of the store in time.

Conventional inventory tasks rely on inventory administrators. An inventory administrator periodically manually selects numbers of inventory components from each inventory category in accordance with policy criteria, performs physical counts of all on-hand quantities for the selected inventory component numbers, and creates an inventory report based on inventory results. However, conventional inventory tasks completely rely on manual work, and the efficiency of the manual inventory is relatively low.

In addition, in existing intelligent warehousing, a transport robot also plays an important role. The transport robot can accept instructions to take out, place, and transport goods at a designated position. In this way, efficiency of transport in the warehouse is improved. Although the current transport robot can take out, place and transport goods, the entire warehouse management system still requires manual weighing of the goods to count the goods, but efficiency of the manual inventory is still very low.

SUMMARY

This application provides a carrying device, a transport robot, an inventory method, and an inventory system, to solve problems in the prior art.

According to a first aspect, this application provides a carrying device, including: a bracket;
  a tray, mounted to the bracket and configured to place goods;
  a weight detection device, configured to detect a weight of the goods placed on the tray; and
  a retractable arm assembly, configured to push the goods placed on the supporting plate out of the tray or pull the goods to the tray.

Compared with the prior art, in the carrying device and the transport robot having the carrying device in embodiments of this application, the weight detection device is arranged on the tray of the carrying device to detect the weight of the goods placed on the tray. A quantity of the goods may be determined according to the weight of the goods. Therefore, manual inventory of the goods is avoided, thereby preventing inefficient carrying of goods.

According to a second aspect, this application provides a transport robot. The transport robot includes a carrying device. The carrying device includes:
  a bracket;
  a tray, mounted to the bracket and configured to place goods;
  a weight detection device, configured to detect a weight of the goods placed on the tray; and
  a retractable arm assembly, configured to push the goods placed on the tray out of the tray or pull the goods to the tray.

Compared with the prior art, in the carrying device and the transport robot having the carrying device in embodiments of this application, the weight detection device is arranged on the tray of the carrying device to detect the weight of the goods placed on the tray. A quantity of the goods may be determined according to the weight of the goods. Therefore, manual inventory of the goods is avoided, thereby preventing inefficient carrying of goods.

According to a third aspect, this application provides an inventory method applicable to the above transport robot. The transport robot is configured to travel in a preset space and take out and place an object located in the preset space. The method includes:
  acquiring inventory information, and traveling to a first position in the preset space according to the inventory information;
  detecting real-time weight information of to-be-inventoried objects corresponding to the first position; and
  processing the to-be-inventoried objects according to the real-time weight information.

Compared with a conventional technology, according to the inventory method based on the transport robot, the transport robot, and the inventory system provided in the embodiments of the present invention, the transport robot first acquires the inventory information, and travels to the first position in the preset space according to the inventory information. Then the transport robot detects the real-time weight information of the to-be-inventoried objects corresponding to the first position. Finally, the transport robot processes the to-be-inventoried objects according to the real-time weight information. Since the transport robot can automatically takes inventory of the goods, the inventory method has relatively high inventory efficiency.

According to a fourth aspect, this application provides an inventory method applicable to the above transport robot. The transport robot is configured to travel in a preset space and take out and place a box located in the preset space, and the box is configured to store goods. The method includes:
obtaining at least one box;
detecting real-time weight information of the box; and
processing the box when a weight of the box changes.

Compared with a conventional technology, in the daily inventory method based on the transport robot provided in the embodiments of the present invention, the at least one box is obtained, the real-time weight information of the box is detected, and the box is processed when the weight of the box changes. By counting the goods in the daily box carrying process, an abnormality of the box can be found in time, and a warehousing status can be learned in time, thereby preventing various problems related to warehousing.

According to a fifth aspect, this application provides an inventory system, including a processing terminal and a transport robot, where the transport robot is configured to communicate with the processing terminal.

The transport robot includes:
at least one processor; and
a memory, communicatively connected to the at least one processor, where
the memory stores instructions executable by the at least one processor, the instructions, when executed by the at least one processor, causing the at least one processor to perform the above inventory method.

According to a sixth aspect, this application provides a computer device, including: a memory, a processor, and a computer program stored in the memory and executable in the processor, where when the processor executes the program, the above inventory method is implemented.

According to a sixth aspect, this application provides a computer-readable storage medium, where the computer-readable storage medium stores computer-executable instructions, and the computer-executable instructions, when executed by the processor, are used for implementing the above inventory method.

This application provides a carrying device, a transport robot, an inventory method, and an inventory system. The carrying device includes: a bracket; a tray, mounted to the bracket and configured to place goods; a weight detection device, configured to detect a weight of the goods placed on the tray; and a retractable arm assembly, configured to push the goods placed on the tray out of the tray or pull the goods to the tray. Compared with the prior art, in the carrying device and the transport robot having the carrying device in embodiments of this application, the weight detection device is arranged on the tray of the carrying device to detect the weight of the goods placed on the tray. The quantity of the goods can be determined according to the weight of the goods. Therefore, manual inventory of the goods is avoided, thereby preventing inefficient carrying of goods.

BRIEF DESCRIPTION OF THE DRAWINGS

To describe the technical solutions in the embodiments of this application or in the related art more clearly, the following briefly describes the accompanying drawings required for describing the embodiments or the related art. Apparently, the accompanying drawings in the following description show some embodiments of this application, and those of ordinary skill in the art may derive other drawings from the accompanying drawings without creative efforts.

REFERENCE NUMERALS

100. Transport robot; 10. Chassis;
20. Multi-layer rack; 22. A plurality of separators;
30. Carrying device; 32. Bracket; 34. Fork; 36. Rotary mechanism;
340. Tray; 342. Weight detection device; 352. Image detection device; 3400. Upper surface; 3402. Lower surface; 344. Retractable arm; 346. Fixed push rod; 348. Movable push rod;
101. Box; 200. Processing terminal;
300. Warehouse; 310. Roadway; 320. Common region; 330. Workstation region; 311. Shelving unit; 3112. Support; 3114. Support plate; 201. Storage position.

DETAILED DESCRIPTION

In order to make objectives, technical solutions, and advantages of embodiments of this application clearer, the technical solutions in the embodiments of this application will be clearly and completely described below with reference to the accompanying drawings. Apparently, the embodiments to be described are a part rather than all of the embodiments of this application. All other embodiments obtained by those of ordinary skill in the art based on the embodiments of this application without creative efforts shall fall within the protection scope of this application.

A transport robot provided herein is applicable to any suitable industry field or technical field, such as the field of intelligent warehousing, intelligent logistics, intelligent sorting, or home furnishing.

The transport robot may be constructed into any suitable structure to realize a carrying function.

Figure 1A:
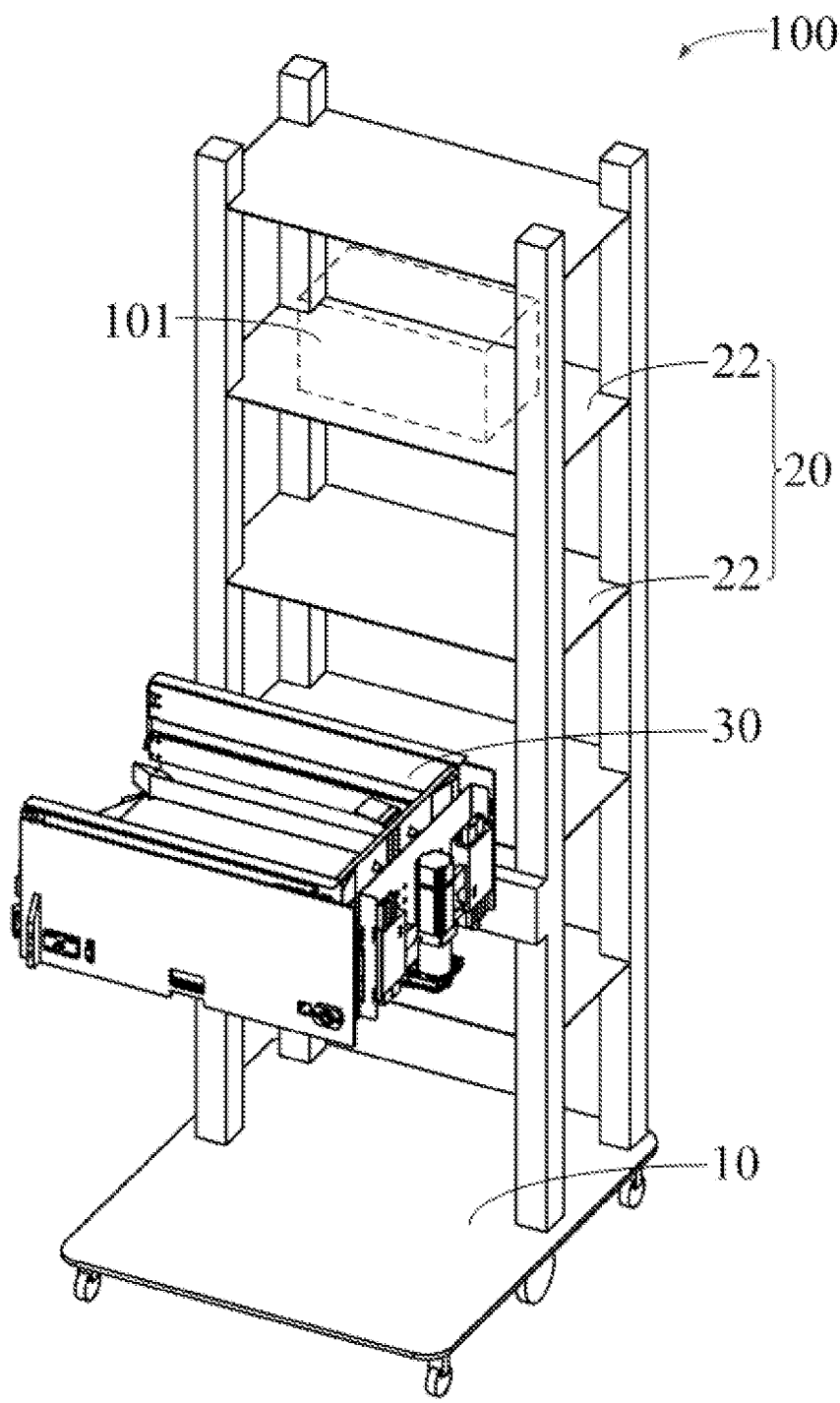
FIG. 1a is a three-dimensional diagram of a transport robot according to an embodiment of this application.
Figure 1B:
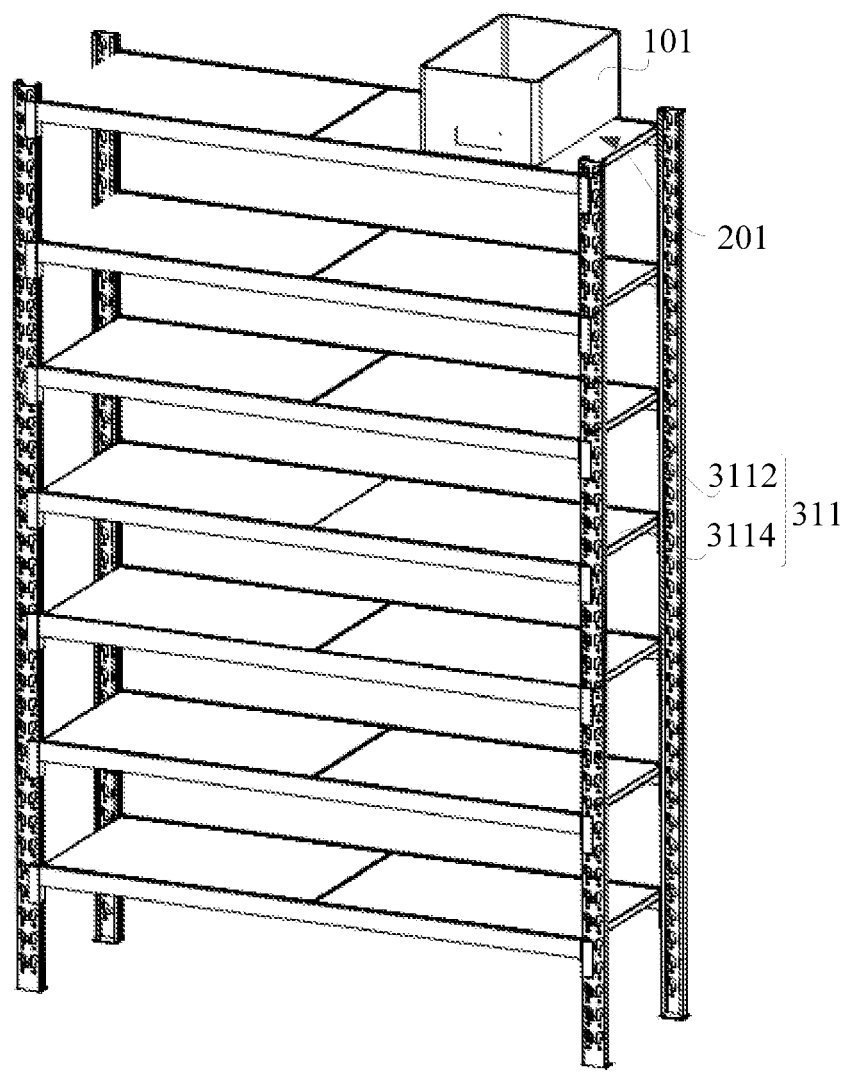
FIG. 1B is a schematic structural diagram of a warehousing shelving unit according to an embodiment of this application.

FIG. 1a is a three-dimensional diagram of a transport robot 100 according to an embodiment of this application, and FIG. 1B is a schematic structural diagram of a warehousing shelving unit according to an embodiment of the present invention. Referring to FIG. 1a and FIG. 1B, the transport robot 100 may transport a box 101 located on a shelving unit 311 in a warehouse configured to store goods. The shelving unit 311 is composed of a plurality of supports 3112 and support plates 3114. The box 101 may be placed on one of the support plates 3114.

In some embodiments, the support plate 3114 may be divided into a plurality of storage positions 201 in advance, and one box 101 may be placed at each one storage position 201.

The transport robot 100 in this embodiment of this application is configured to transport the box 101 on a warehouse shelving unit (not shown in the figure) for storing goods.

The warehouse shelving unit may have a single layer or a plurality of layers, and any layer of the warehouse shelving unit is configured to place the box 101. One or more warehouse shelving unit may be arranged.

The transport robot 100 includes a chassis 10, a multi-layer rack 20, a lifting device (not shown in the figure), and a carrying device 30.

The chassis 10 supports the multi-layer rack 20, the lifting device, and the carrying device 30. The chassis 10 is mobile, and drives the multi-layer rack 20, the lifting device, and the carrying device 30 supported on the chassis to move. By means of the mobile chassis 10, the transport robot 100 can transport the box 101 among a plurality of warehouse shelving units.

Any layer of the multi-layer rack 20 is configured to place the box 101. Specifically, the multi-layer rack 20 includes a plurality of separators 22. The plurality of separators 22 divide the multi-layer rack 20 into a plurality of layers. Any of the plurality of separators 22 is configured to place the box 101.

The lifting device is configured to drive the carrying device 30 to rise or fall. The lifting device is powered by a motor. The power is transmitted by a chain wheel mechanism. According to an actual situation, the chain wheel mechanism may be replaced with a transmission mechanism such as a screw mechanism or a belt wheel mechanism. Alternatively, the chain wheel mechanism may be omitted, and the lifting device is directly driven by the motor. In this case, the motor is a linear motor. For example, the lifting device may be a transmission mechanism such as a chain wheel mechanism or a belt wheel mechanism, and output power by using a motor, a pneumatic motor, or a hydraulic transmission system.

The carrying device 30 is configured to transport the box 101 between the multi-layer rack 20 and the warehouse shelving unit. By driving the carrying device 30 to rise or fall by the lifting device, the carrying device 30 can carry the box 101 on any layer of the multi-layer rack 20 or any layer of the warehouse shelving unit.

It may be understood that the carrying device 30 is not only applicable to the transport robot 100. For example, the carrying device 30 may be further applicable to fields such as shuttles and sorting platforms.

Figure 2:
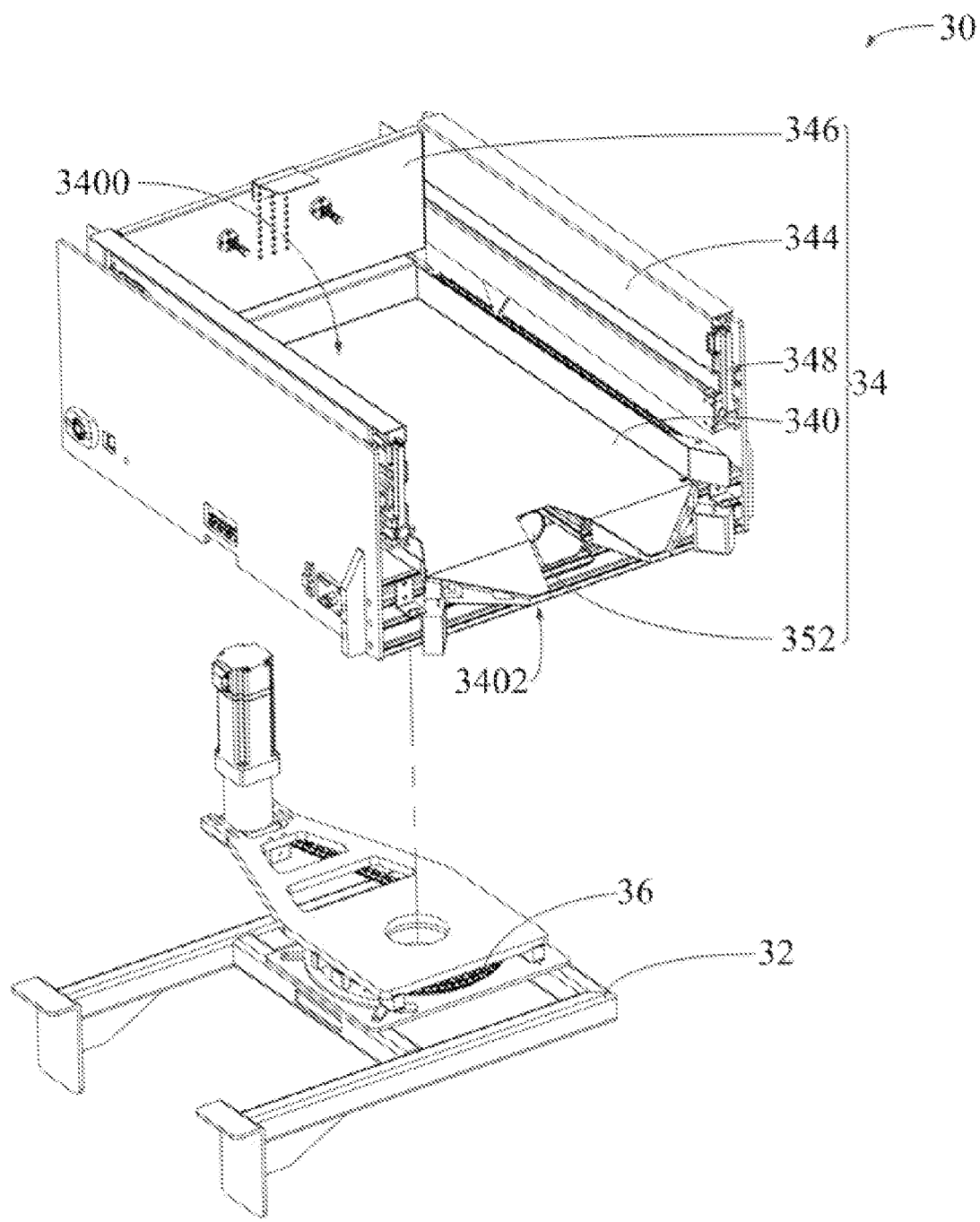
FIG. 2 is a schematic disassembled diagram of a carrying device of the transport robot shown in FIG. 1.
Figure 3:
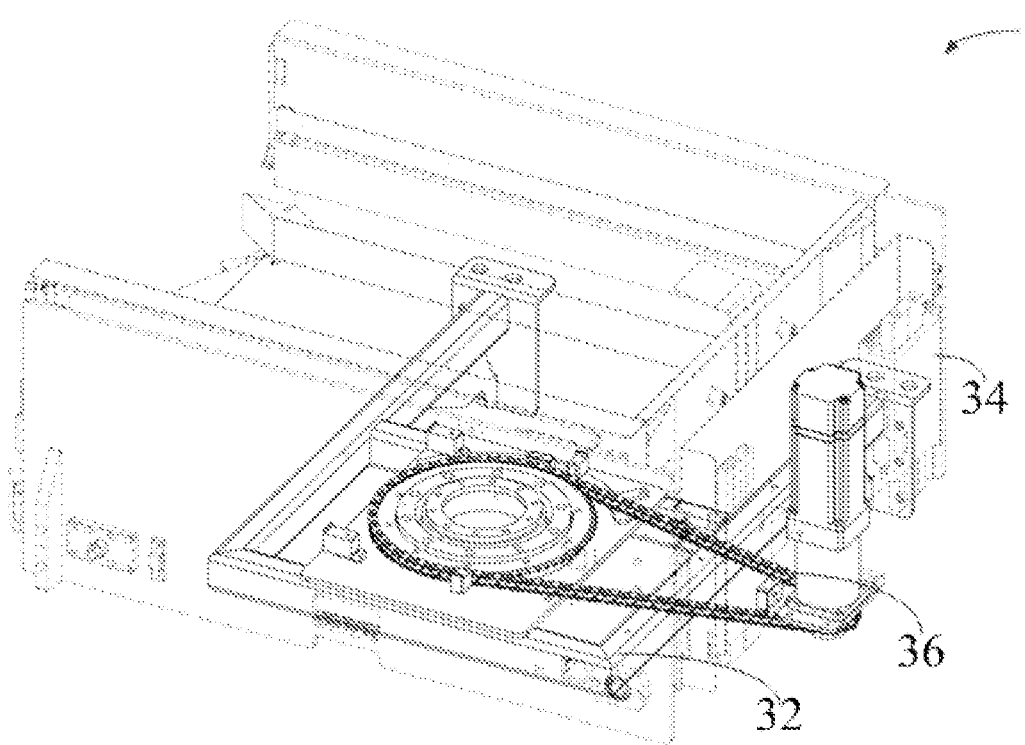
FIG. 3 is a perspective view of the carrying device shown in FIG. 2 with a fork being transparentized to show a rotary mechanism.

Referring to FIGS. 2 and 3, the carrying device 30 includes a bracket 32, a fork 34, and a rotary mechanism 36.

The bracket 32 may be formed by welding a profile and a plate, and is configured to support the fork 34 and the rotary mechanism 36.

The fork 34 is mounted to the bracket 32, and the rotary mechanism 36 is configured to drive the fork 34 to rotate about a vertical axis relative to the bracket 32.

As shown in FIG. 3, the rotary mechanism 36 is powered by the motor. The power is transmitted by a chain wheel mechanism. It may be understood that, the chain wheel mechanism may be replaced with a belt wheel mechanism, a rack and pinion mechanism, a screw mechanism, or the like. Alternatively, the chain wheel mechanism may be omitted, and the rotary mechanism is directly driven by the motor.

The fork 34 is configured to be aligned with the multi-layer rack 20 or the warehouse shelving unit and then carry the box 101 between the multi-layer rack 20 and the warehouse shelving unit. If the fork 34 is not aligned to the multi-layer rack 20, the fork 34 may be rotated relative to the bracket 32 to ensure that the fork 34 is aligned to the multi-layer rack 20.

It may be understood that, according to the actual situation, the fork 34 may be fixedly mounted to the bracket 32. Correspondingly, the rotary mechanism 36 may be omitted. For example, the transport robot 100 is fixed on the ground, or the transport robot 100 has a fixed track. In this case, the fork 34 can always be aligned to the multi-layer rack 20, and obviously, the fork 34 is not required to be rotated. In another example, the chassis 10 has a steering function. By steering the chassis 10, it can also be ensured that the fork 34 is aligned to the multi-layer rack 20, so that the rotary mechanism 36 can be omitted.

Referring to FIGS. 2 to 5, the fork 34 includes a tray 340, a weight detection device 342, a retractable arm 344 assembly, and an image detection device 352.

The tray 340 is configured to place the box 101, and is a flat plate horizontally arranged. The tray 340 has an upper surface 3400 and a lower surface 3402 opposite to each other. The upper surface 3400 is configured to place the box 101.

Figure 4:
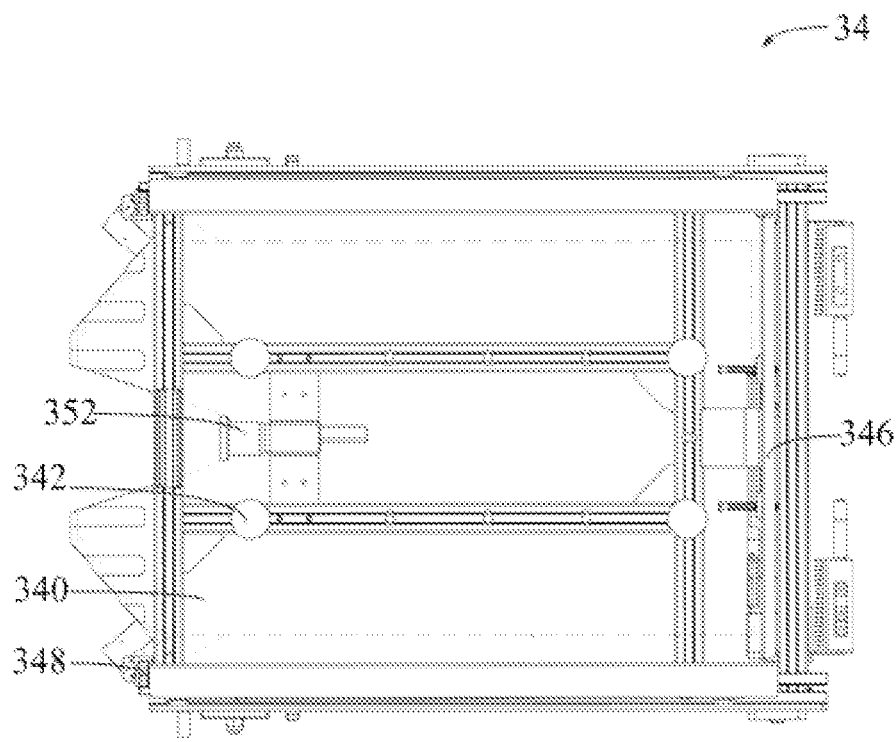
FIG. 4 is a top view of the fork of the carrying device shown in FIG. 2 with a tray being transparentized to show a weight detection device of the fork.
Figure 5:
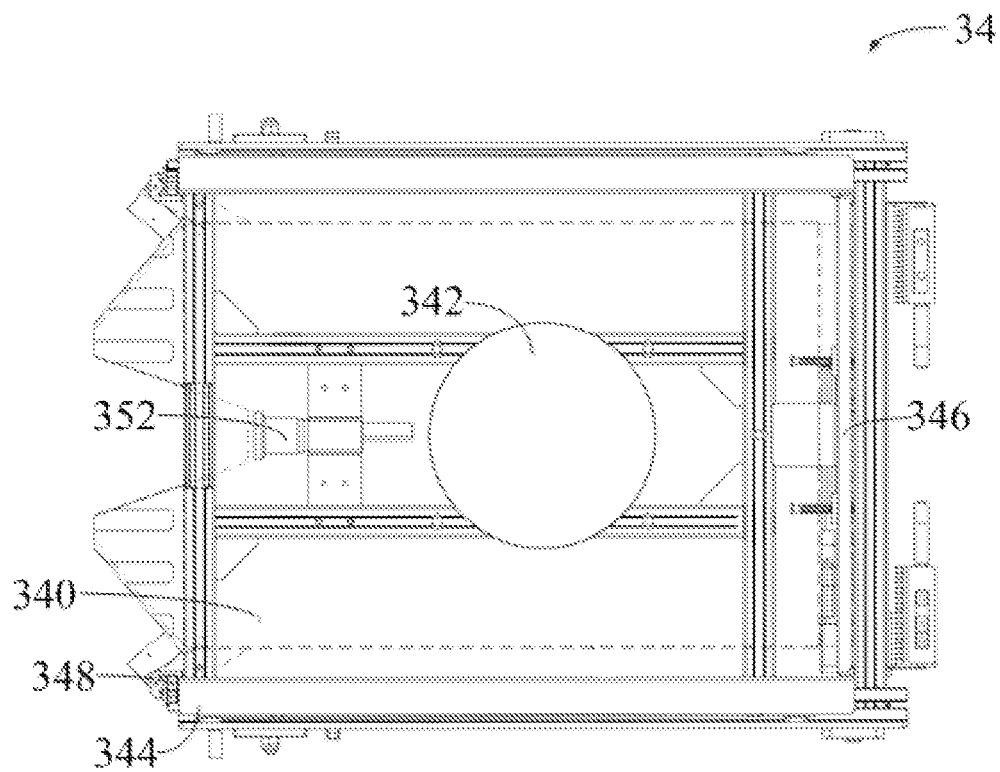
FIG. 5 is a top view of the fork of the carrying device shown in FIG. 2 in another implementation with a tray being transparentized to show the weight detection device.

The weight detection device 342 is configured to detect a weight of the box 101 placed on the tray 340, and is arranged on the lower surface 3402 of the tray 340. The weight detection device 342 is a pressure sensor and is in a block shape. As shown in FIG. 4, a plurality of weight detection devices 342 are evenly distributed on a horizontal plane, that is, a plane parallel to the tray 340. For example, four weight detection devices 342 are distributed in a rectangular shape. By arranging the plurality of weight detection devices 342 in even distribution, inaccurate detection as a result of the box 101 being located on a side of the tray 340 can be avoided. In some other embodiments, as shown in FIG. 5, the weight detection device 342 is located in a center of the tray 340. In this case, only one weight detection device 342 may be arranged.

The weight information of the box 101 detected by the weight detection device 342 is processed by a processor mounted to the transport robot 100, to obtain quantity information of the box 101, or is uploaded to a server and processed by the server, to obtain the quantity information of the box 101.

The retractable arm 344 assembly is configured to push the box 101 placed on the tray 340 out of the tray 340 or pull the box 101 to the tray 340. The retractable arm 344 assembly includes a retractable arm 344, a fixed push rod 346, and a movable push rod 348.

The retractable arm 344 can extend horizontally. In a direction perpendicular to the extending direction of the retractable arm 344 and parallel to the tray 340, the retractable arm 344 is located on a side of the tray 340.

Figure 6:
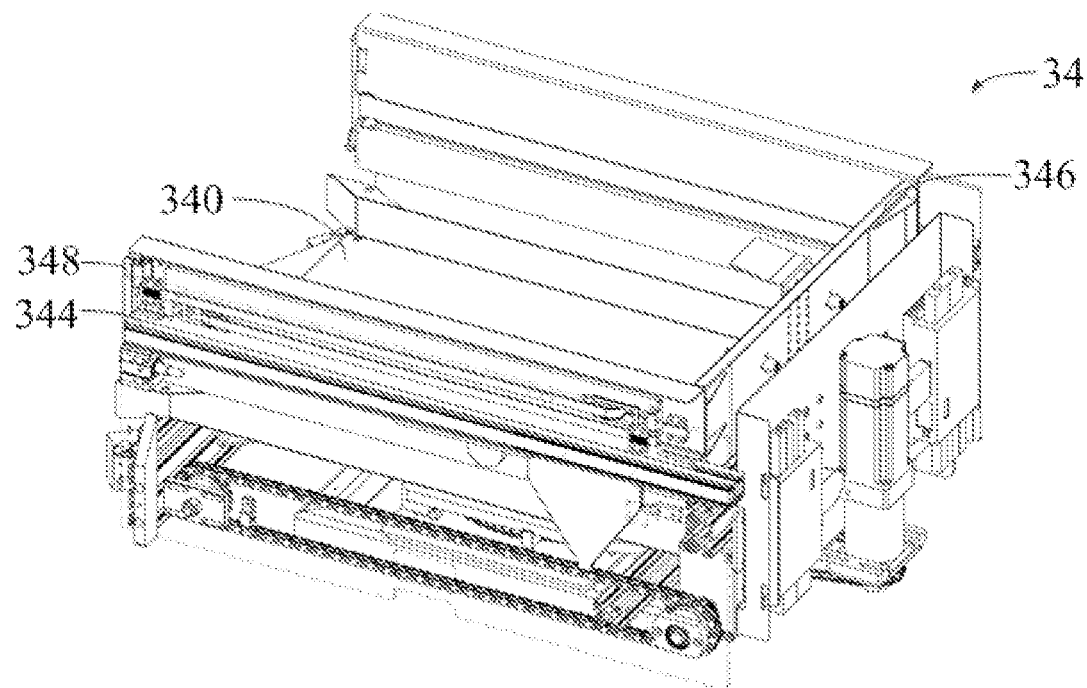
FIG. 6 is a three-dimensional diagram of the fork of the carrying device shown in FIG. 2 with a part of a housing being transparentized to show a driving mode of the fork.

As shown in FIG. 6, the retractable arm 344 is powered by the motor. The power is transmitted by a chain wheel mechanism. According to an actual situation, the chain wheel mechanism may be replaced by a transmission mechanism such as a belt wheel mechanism or a screw mechanism for driving.

The fixed push rod 346 and the movable push rod 348 are both mounted to the retractable arm 344, and the fixed push rod 346 and the movable push rod 348 are located on a same side of the retractable arm 344 as the tray 340. When the retractable arm 344 extends, the retractable arm 344 drives the fixed push rod 346 and the movable push rod 348 to extend. The movable push rod 348 is located in an extending direction of the fixed push rod 346 along the retractable arm 344, and the movable push rod 348 may be received in the retractable arm 344. The movable push rod 348 may be directly driven by the motor. According to an actual situation, the power may alternatively be transmitted by using a transmission mechanism such as a gear set or a link mechanism.

Figure 7:
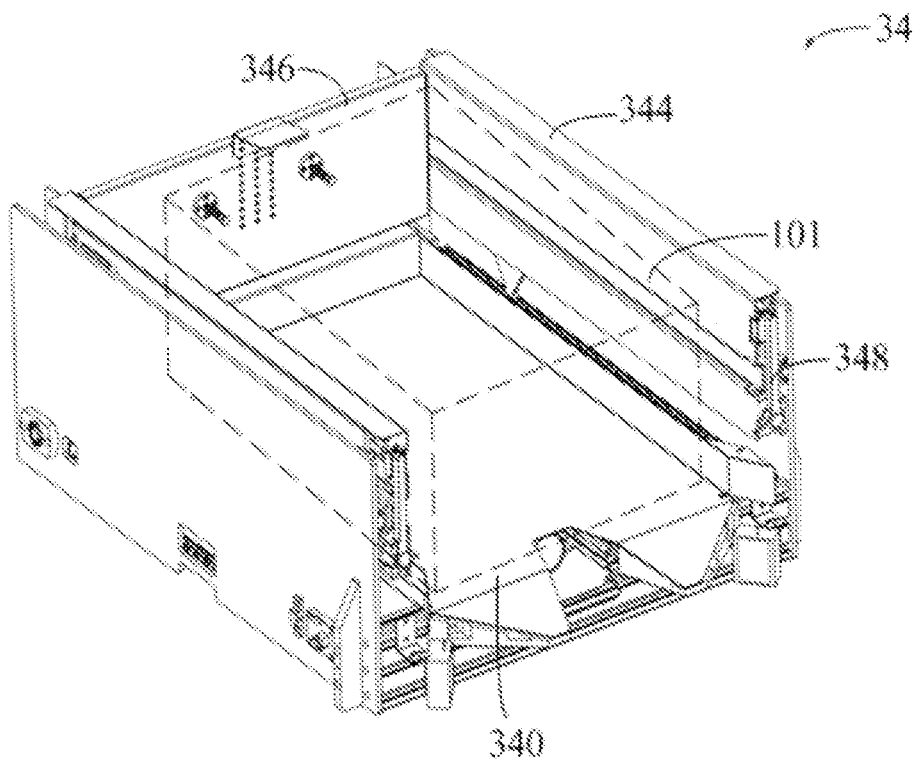
FIG. 7 is a three-dimensional diagram of the fork in FIG. 4 with a fixed push rod being about to push goods out of the tray.
Figure 10:
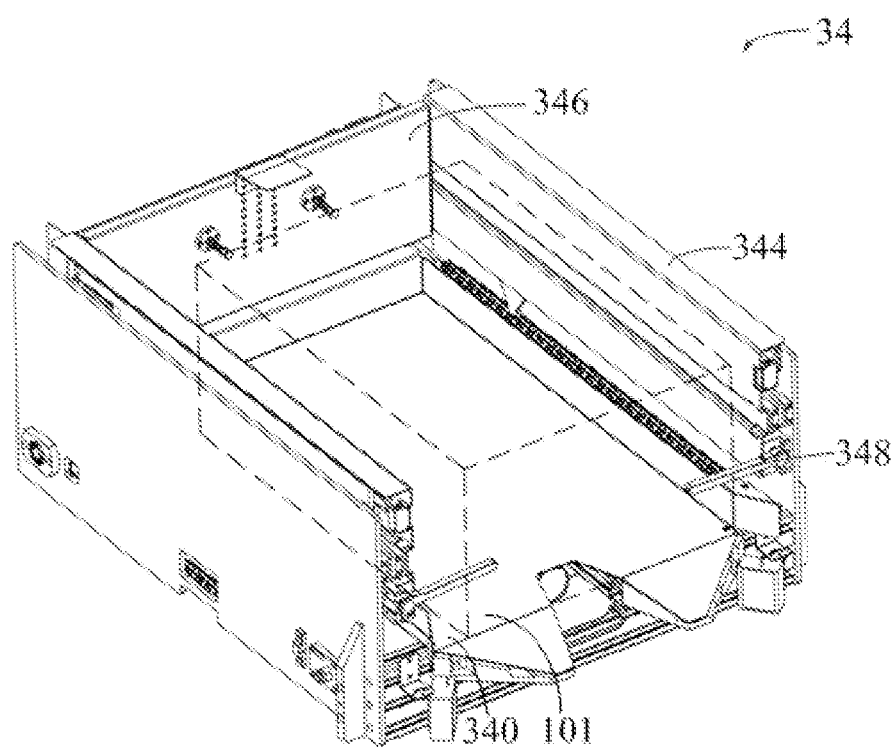
FIG. 10 is a three-dimensional diagram of the fork in FIG. 4 with the movable push rod having pulled the goods to the tray.

Referring to FIGS. 7 and 10, how the fixed push rod 346 and the movable push rod 348 carry the box 101 on the tray 340 is described as follows.

Figure 8:
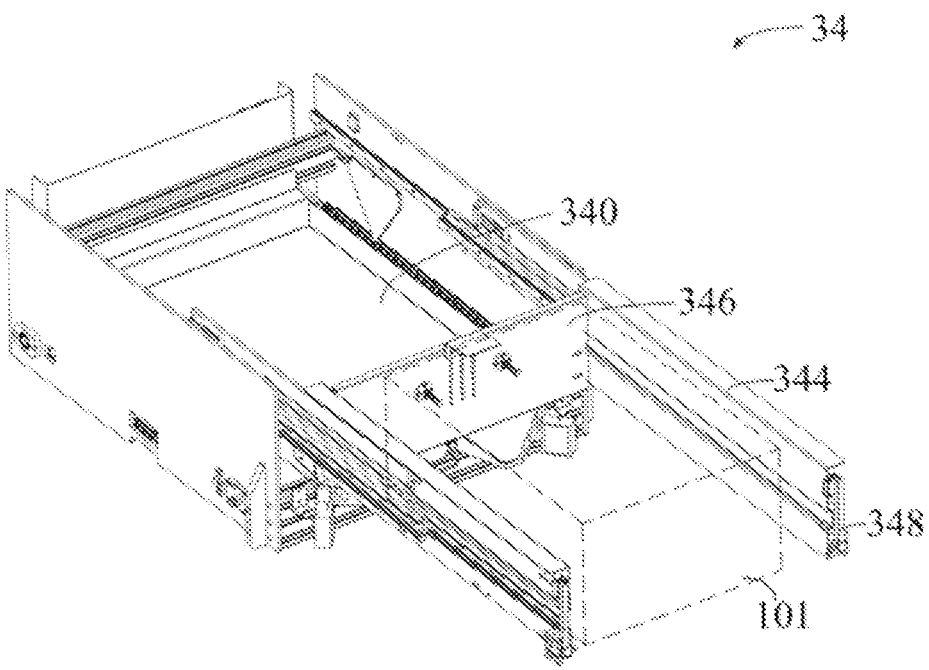
FIG. 8 is a three-dimensional view of the fork in FIG. 4 with the fixed push rod having pushed the goods out of the tray or a movable push rod unfolding and surpassing the goods to pull the goods to the tray.

When the retractable arm 344 extends, the fixed push rod 346 is configured to push the box 101 out of the tray 340. Specifically, as shown in FIGS. 7 and 8, the fixed push rod 346 extends out with the retractable arm 344 to push the box 101 out of the tray 340. After the fixed push rod 346 pushes out the box 101, the movable push rod 348 is received into the retractable arm 344 and retracts along with the retractable arm 344.

Figure 9:
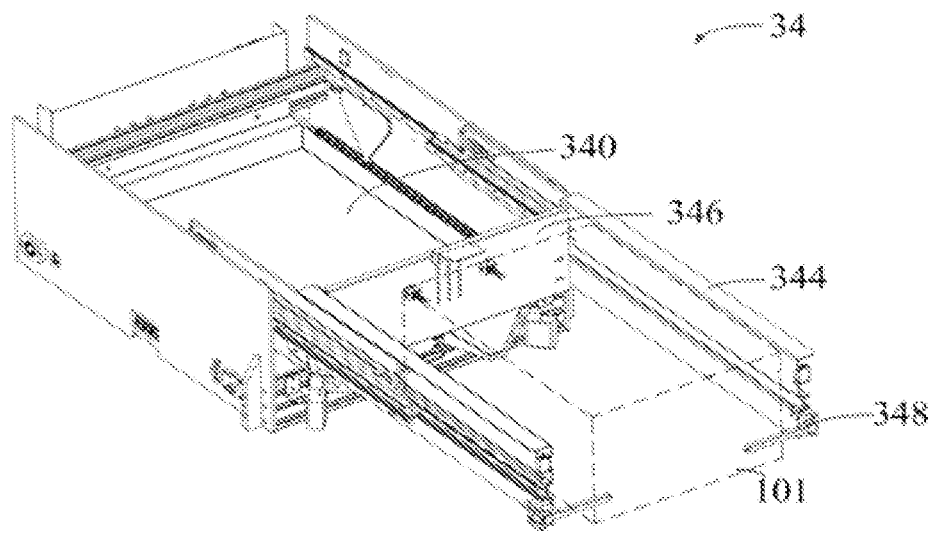
FIG. 9 is a three-dimensional view of the fork in FIG. 4 with the movable push rod surpassing the goods and resetting to pull the goods to a tray.

When the retractable arm 344 retracts, the movable push rod 348 is configured to pull the box 101 to the tray 340. Specifically, as shown in FIG. 8, the movable push rod 348 is received in the retractable arm 344 and extends with the retractable arm 344, so that the movable push rod 348 surpasses the box 101. As shown in FIGS. 9 and 10, after the movable push rod 348 surpasses the box 101, the movable push rod 348 extends out of the retractable arm 344 and retracts along with the retractable arm 344. In this way, the movable push rod 348 pulls the box 101 to the tray 340.

How the fork 34 carries the box 101 on the multi-layer rack 20 is further described as follows.

The fork 34 carries the box 101 to the multi-layer rack 20. Specifically, the fixed push rod 346 extends with the retractable arm 344 to push the box 101 to the multi-layer rack 20, and then the movable push rod 348 is received into the retractable arm 344 and retracts along with the retractable arm 344.

The fork 34 carries the box 101 from the multi-layer rack 20. Specifically, the movable push rod 348 is received in the retractable arm 344 and extends with the retractable arm 344, so that the movable push rod 348 surpasses the box 101. After the movable push rod 348 surpasses the box 101, the movable push rod 348 resets and retracts with the retractable arm 344, so that the movable push rod 348 pulls the box 101 from the multi-layer rack 20.

The way in which the fork 34 carries the box 101 on the warehouse shelving unit is similar to the way in which the fork carries the box 101 on the multi-layer rack 20. Therefore, details are not described herein.

The image detection device 352 is configured to acquire image information of the box 101 or the warehouse shelving unit. The image detection device 352 may be a camera, and is configured to scan an identification code attached to the box 101 or the warehouse shelving unit, determine, according to the identification code on the warehouse shelving unit, whether the carrying device 30 is at the same height as the layer of the to-be-carried goods on the warehouse shelving unit, and determine, according to the identification code on the box 101, whether the fork 34 is aligned with the warehouse shelving unit. The image detection device 352 is fixed relative to the tray 340. Precisely, the image detection device is mounted to the lower surface 3402 of the tray 340.

It should be noted that, rising and falling of the carrying device 30 to the same height as the layer of the to-be-carried box 101 in the multi-layer rack 20 or alignment of the fork 34 to the multi-layer rack 20 is set by an initial program, which is more efficient. Certainly, the above may alternatively be performed by scanning QR codes.

In addition, it should be noted that, the box 101 may be an entirety or include a plurality of objects. When the box 101 includes a plurality of objects, the box is adapted to be placed in one container. Correspondingly, the QR code of the box 101 is pasted on an outer side of the container.

It may be understood that the motor can be replaced with a power device such as an air motor or a hydraulic system.

Compared with the prior art, in the carrying device 30 and the transport robot 100 having the carrying device 30 provided in this embodiment of this application, the weight detection device 342 is arranged on the tray 340 to detect the weight of the goods placed on the tray 340.

The quantity of the goods may be determined according to a real-time weight of the goods and weight information of a single goods pre-stored in the system. Therefore, inefficient manual inventory of the goods is avoided.

Figure 11:
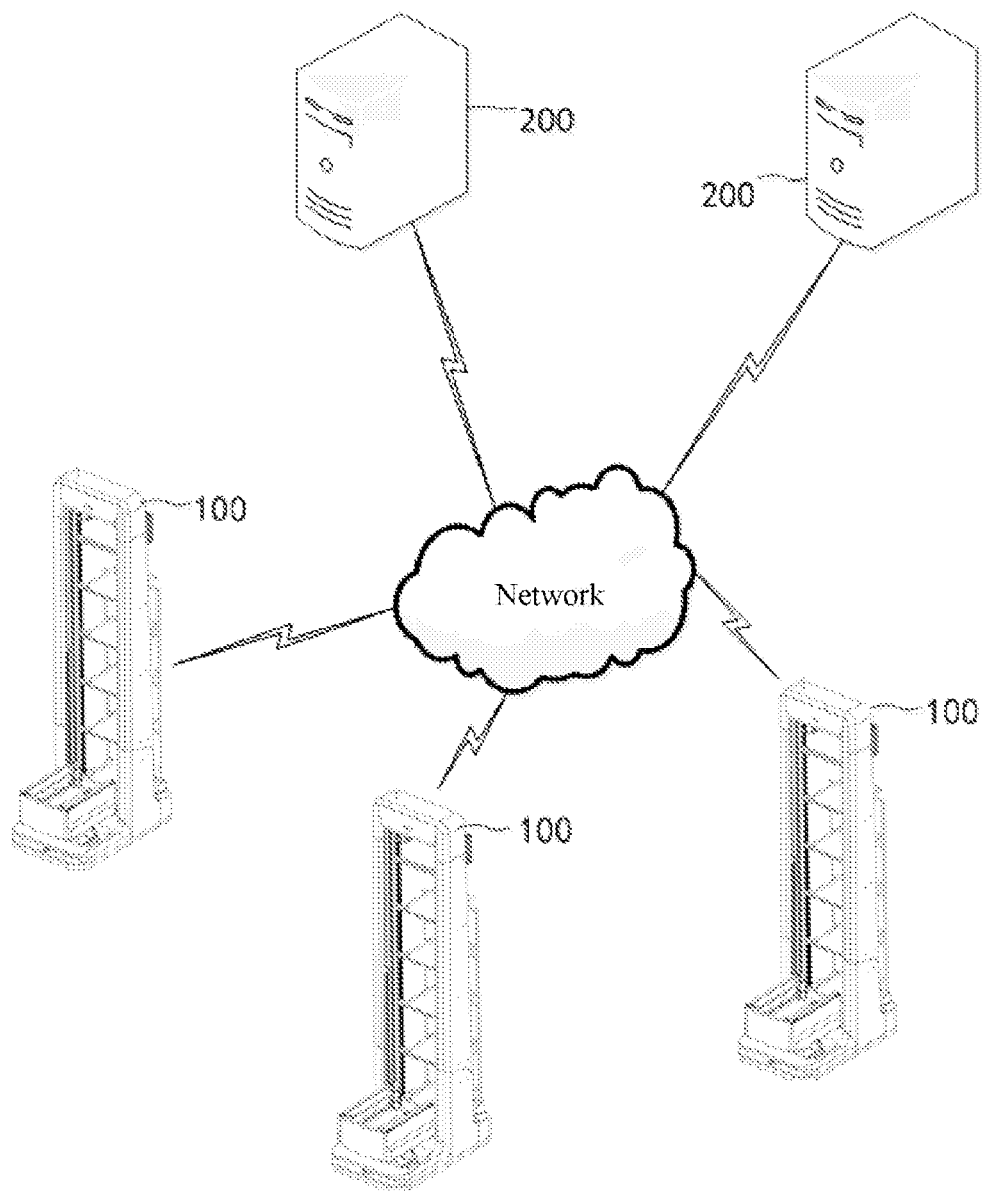
FIG. 11 is a schematic architectural diagram of an inventory system according to an embodiment of the present invention.

In some embodiments, referring to FIG. 11, the transport robot 100 may form an inventory system with a processing terminal 200, and may communicate with the processing terminal 200 for arrangement, planning, and operation of the inventory task. For example, the processing terminal 200 sends inventory information to the transport robot 100, and the transport robot 100 counts goods at a specific position or each position of the warehousing shelving unit according to the inventory information.

In some embodiments, the processing terminal 200 may further control navigation of the transport robot 100. For example, the transport robot 100 receives a scheduling instruction from the processing terminal 200. The scheduling instruction include a retrieval position, a destination position, a planned route, and goods information. The transport robot 100 moves to the retrieval position along the planned route in a warehouse 300 according to the scheduling instruction, and obtains the corresponding goods and then transports the goods to the destination position.

In some embodiments, the processing terminal 200 herein may be a server, and the server is a physical server or a logical server obtained by virtualizing a plurality of physical servers. The processing terminal 200 may alternatively be a server group composed of a plurality of servers that can communicate with each other, and each functional module may be distributed on each server in the server group.

In some embodiments, the processing terminal 200 may form a management system (WMS) of the warehouse 300 with other warehouse management devices. Alternatively, the processing terminal 200 is configured with system applications and products (SAP) software or the like.

An embodiment of the present invention provides an inventory method based on the transport robot 100. The transport robot 100 may travel in a preset space and take out and place objects located in the preset space. The preset space is a range of a movement space of the transport robot 100. In a different service scenario, the definition of the preset space may vary. For example, in a home furnishing service scenario, the preset space is a sum of indoor spaces separated by walls. In a warehousing service scenario, the preset space is the warehouse 300.

Figure 12:
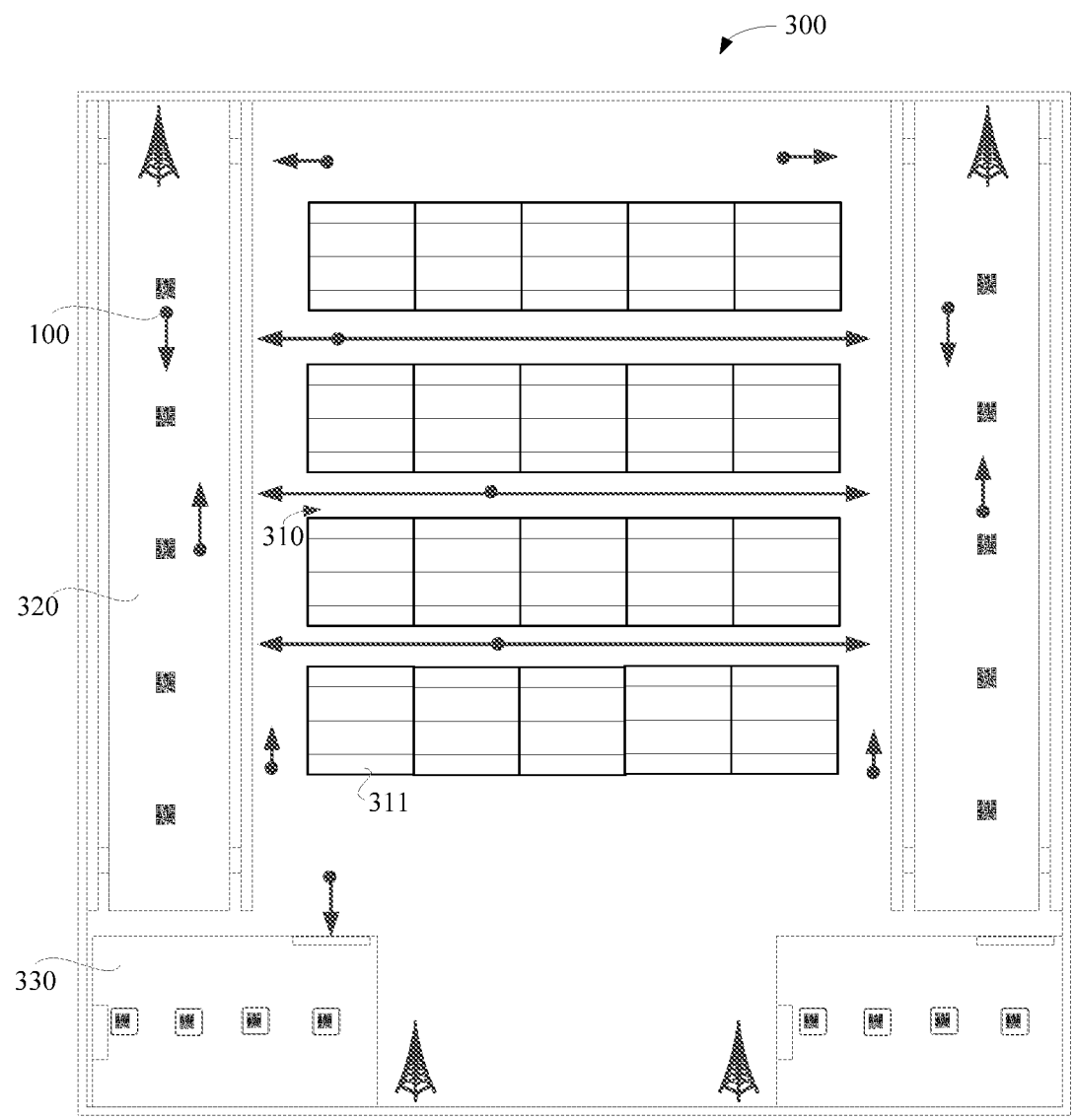
FIG. 12 is an equivalent schematic diagram of a warehouse according to an embodiment of the present invention in which a transport robot can travel.

For example, referring to FIG. 12, the warehouse 300 includes a roadway 310, a common region 320, and a workstation region 330.

The roadway 310 is formed by at least two rows of shelving units placed opposite to each other. The shelving units located on the same side are arranged side by side, and a plurality of shelving units may be arranged on the same side. In addition, the warehouse 300 may include a plurality of rows of shelving units 311. A roadway 310 is formed between any two adjacent shelving units in the plurality of rows of shelving units 311. Therefore, a plurality of roadways 310 can be formed among the plurality of rows of shelving units 311. The transport robot 100 can take out and place the goods on the warehousing shelving units in the roadways 310.

The common region 320 is a region all transport robots 100 pass through during navigation. For example, a transport robot A1 is required to travel to a first container in a first row of shelving units to take out the goods, and a transport robot A2 is required to transport goods in a second container of the first row of shelving units to the workstation region 330. Therefore, the transport robot A1 and the transport robot A2 pass through the common region 320.

Generally, during warehousing of goods, the system records the stock keeping unit (SKU) information of each goods. The SKU information may include information such as a size, a standard weight, a color, and an RFID number of each goods.

The workstation region 330 is a region where each transport robot 100 manipulates the container or the goods. For example, when the transport robot 100 finds an abnormal object during inventory, the transport robot 100 places the abnormal object at a preset position on the workstation region 330, and an inventory administrator manually takes inventory of the object again at the preset position. When the object is checked as correct, the inventory administrator puts the object on the corresponding transport robot 100 in the workstation region 330, and the transport robot 100 transports and places the object to the corresponding warehousing shelving unit. The inventory method may be detecting whether standard weight information of the goods matches standard weight information preset in a preset SKU in the system, to determine whether the quantity of the goods is accurate.

In some embodiments, when the transport robot 100 travels in the warehouse 300, a plurality of indoor positioning methods may be used for positioning and navigation.

It may be understood that, the transport robot 100 may complete positioning and navigation by using other positioning methods, which are not limited to the method provided in this embodiment of the present invention.

Figure 13:
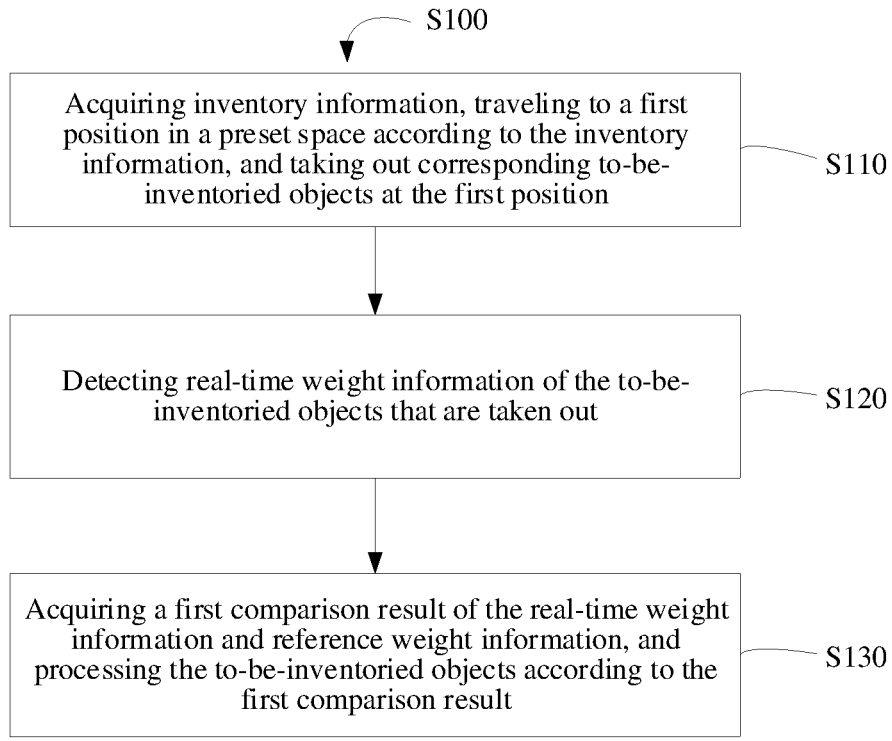
FIG. 13 is a schematic flowchart of an inventory method based on the transport robot according to an embodiment of the present invention.

Referring to FIG. 13, in some implementations, the inventory method S100 based on the transport robot includes the following steps.

S110: Acquiring inventory information, and traveling to a first position in a preset space according to the inventory information.

In this embodiment, the inventory information is used for instructing the transport robot to travel to the first position in the preset space and take out to-be-inventoried objects corresponding to the first position.

The inventory information may be information of to-be-inventoried object. The information of to-be-inventoried object includes information about the first position of the to-be-inventoried objects and SKU information. The SKU information may correspondingly include standard weight information, volumes and specifications, or object names of the to-be-inventoried objects.

It may be further understood that the inventory information may further include inventory rule information, such as a preset inventory time, a preset inventory range, a preset inventory cycles, a preset type of to-be-inventoried objects, and a preset quantity of to-be-inventoried objects.

In some embodiments, the inventory information is delivered to the transport robot by a processing terminal configured to communicate with the transport robot. For example, a system data clerk or an inventory clerk configures an inventory plan on the processing terminal according to a certain rule, and the processing terminal sends the inventory information to the transport robot at a preset time point. The preset time point is defined by a user according to service requirements. For example, the preset time point may be determined as a time point after completion of a production task. In this way, the transport robot is not required to be manually restarted with power, thereby avoiding some tedious inventory processes.

It may be understood that, in some embodiments, the inventory information is automatically generated by the transport robot. For example, the inventory information is automatically triggered and generated by the transport robot according to a preset rule. The preset rule may include an automatic start time. For a warehouse not operating during the night, the transport robot may automatically trigger the generation of inventory information. For example, the inventory information is inventory of all objects in the entire warehouse. Therefore, the transport robot performs cyclic inventory on the entire warehouse according to the inventory information. For example, the transport robot completes inventory of a specific proportion of the to-be-inventoried objects every night. After a plurality of cyclic inventories during the night, the inventory task of the entire warehouse is completed.

In this embodiment, as described above, the preset space may be other suitable spaces such as a warehouse or a home interior space. The preset space is divided into a plurality of first positions in advance, and each first position may be used for placing an object or may be idle. The first position occupies a space having a specific volume. Sizes of all of the first positions may be the same or different, and may be assigned according to service requirements. For example, as described above, a plurality of rows of warehousing shelving units are arranged in the warehouse, and a support plate of each warehousing shelving unit may be divided into a plurality of first positions in advance. Sizes of every two adjacent first positions may be the same or different.

In this embodiment, the first position may be the position of the to-be-inventoried objects a position of an initial to-be-inventoried shelving unit, or the position of the initial to-be-inventoried shelving unit and a position of a last to-be-inventoried shelving unit.

S120: Detecting real-time weight information of to-be-inventoried objects corresponding to the first position.

In this embodiment, the "to-be-inventoried objects" are relative to "objects". The "to-be-inventoried objects" are objects required to be inventoried. For example, the objects include a box and/or goods placed in the box. The processing terminal records ID information of the box and goods information of the goods stored in the box. The goods information includes a goods name, a goods quantity, or weight information of a single goods, and the like. It may be understood that the box may be constructed into a shape facilitating carrying by the transport robot.

In some embodiments, when detecting the real-time weight information of the to-be-inventoried objects corresponding to the first position, the transport robot may further take out the to-be-inventoried objects corresponding to the first position, and then detect the real-time weight information of the to-be-inventoried objects that are taken out.

In some embodiments, the expression "take out" may be understood as holding the to-be-inventoried objects within the warehousing shelving unit, or may be understood as holding the to-be-inventoried objects in the air after moving the to-be-inventoried objects out of the warehousing shelving unit, or may be understood as moving the to-be-inventoried objects from the warehousing shelving unit to a multi-layer rack of the transport robot, or even may be understood as that the transport robot removes a specific support so that the to-be-inventoried objects move with the specific support when the first position is defined on the specific support and the to-be-inventoried objects are placed at the first position, which may also be "take out".

In this embodiment, the real-time weight information is current weight information of the to-be-inventoried objects. For example, during storage of the to-be-inventoried objects, the current weight information is 50 catties. After ten catties of goods are taken out, the to-be-inventoried objects are stored again. At this time, the current weight information of the to-be-inventoried objects is 40 catties. In this case, during an inventory task, the transport robot takes out the to-be-inventoried objects by using the carrying device, and after the to-be-inventoried objects are taken out, a weighing device arranged on the carrying device can detect that the current weight information of the to-be-inventoried objects is 40 catties. That is to say, the current weight information of 40 catties is the real-time weight information.

It may be understood that, in addition to arranging the weighing device on the fork, the weighing device may alternatively be arranged at any suitable position in the transport robot to detect the weight of the to-be-inventoried objects. For example, the weighing device may be arranged on the chassis or the multi-layer rack of the transport robot or at other suitable positions. In another example, the transport robot includes at least one storage unit configured to store the box. The weighing device is arranged on the at least one storage unit to detect the real-time weight information of the to-be-inventoried objects.

In some embodiments, the weighing device may be any suitable weighing sensor.

It may be further understood that, in addition to detecting the real-time weight information of the to-be-inventoried objects by means of the weighing device, the transport robot may alternatively detect the real-time weight information of the to-be-inventoried objects by other proper technical means.

For example, as described above, the carrying device and the lifting device are arranged on the transport robot, and the lifting device is configured to drive the carrying device to move to take out the to-be-inventoried objects. When detecting the real-time weight information of the to-be-inventoried objects that are taken out, the transport robot first calculates a first acting force when the lifting device drives the carrying device to move in a no-load state. Next, the transport robot calculates a second acting force when the lifting device drives the carrying device to move in an object takeout state. Finally, the transport robot calculates, according to the first acting force and the second acting force, the real-time weight information of the to-be-inventoried objects that are taken out. The no-load state is a state in which the transport robot does not take out the objects, that is, a state in which the carrying device does not take out the objects.

In some embodiments, the movement herein may be a linear movement or a curvilinear movement, and the curvilinear movement includes a circular movement or the like. The linear movement includes a uniform linear movement or an accelerated linear movement. The uniform linear movement may be a uniform linear ascending movement or a uniform linear descending movement, and the accelerated linear movement may be an accelerated linear ascending movement or an accelerated linear descending movement.

In this embodiment, a working principle of calculating the real-time weight information of the to-be-inventoried objects that are taken out is described in detail by using the uniform linear descending movement as an example.

First, when the carrying device of the transport robot does not catch the objects, the transport robot operates in the no-load state. The lifting device of the transport robot drives the carrying device to perform the uniform linear descending movement in the no-load state. At this time, the transport robot detects an acting force required by the lifting device to drive the carrying device to perform the uniform linear descending movement in the no-load state, and sets the acting force as a first acting force $F_1$.

Next, when the carrying device of the transport robot takes out the objects, the transport robot operates in the object takeout state. The lifting device of the transport robot drives the carrying device to perform the uniform linear descending movement in the object takeout state. At this time, the transport robot detects an acting force required by the lifting device to drive the carrying device to perform the uniform linear descending movement in the object takeout state, and sets the acting force as a second acting force $F_2$. According to the Newton's laws of motion, $F_2=F_1+G_1$, where $G_1$ is a gravity of the to-be-inventoried objects. Since $F_1$ and $F_2$ are known quantities, $G_1=F_2-F_1$ can be calculated.

In some embodiments, a working principle of calculating the real-time weight information of the to-be-inventoried objects that are taken out is described in detail by using the accelerated linear descending movement as an example.

First, when the carrying device of the transport robot does not catch the objects, the transport robot operates in the no-load state. The lifting device of the transport robot drives the carrying device to perform the accelerated linear descending movement in the no-load state. At this time, the transport robot detects an acting force required by the lifting device to drive the carrying device to perform the accelerated linear descending movement in the no-load state, and sets the acting force as a first acting force $S_1$. $S_1=P_1-M_1*a_1=M_1*(g-a_1)$, where $P_1$ is a gravity of the carrying device, $M_1$ is the mass of the carrying device, g is the gravitational constant, and $a_1$ is an acceleration of the carrying device. The acceleration $a_1$ of the carrying device may be collected by an accelerometer arranged in the carrying device.

Next, when the carrying device of the transport robot takes out the objects, the transport robot operates in the object takeout state. The lifting device of the transport robot drives the carrying device to perform the accelerated linear descending movement in the object takeout state. At this time, the transport robot detects an acting force required by the lifting device to drive the carrying device to perform the accelerated linear descending movement in the object takeout state, and sets the acting force as a second acting force $S_2$. According to the Newton's laws of motion, $$S_2=(P_1+P_2)-(M_1+M_2)*a_2=M_1*(g-a_1)+M_2*(g-a_2),$$
where $P_2$ is a gravity of the to-be-inventoried objects, and $M_2$ is a mass of the to-be-inventoried objects. Since $S_1$, $S_2$, $a_1$ and $a_2$ are known quantities, the real-time weight information of the to-be-inventoried objects that are taken out may be calculated according to the above equation.

In some embodiments, the lifting device is composed of a motor, a transmission structure, and a lifting plate. The motor outputs a driving force to the transmission structure, and the driving force is used for driving the lifting plate to rise or fall. When the lifting plate is connected to the carrying device, the motor can drive the lifting plate through the transmission structure and thereby drive the carrying device to rise or fall. Since the driving force outputted by a driving motor is in a functional relationship with a driving current of the driving motor.

Therefore, in some embodiments, during calculation of the first acting force when the lifting device drives the carrying device to move in the no-load state, the transport robot first detects a first driving current when the lifting device drives the carrying device to move in the no-load state. Next, the transport robot calculates the first acting force according to the relationship between the acting force and the driving current. For example, the first acting force F1=k*I, where k is a proportional constant between the acting force and the driving current, and I is the driving current. When the driving current I is detected and the proportional constant k is obtained, the first acting force F1 can be obtained.

Therefore, in some embodiments, during calculation of the second acting force when the lifting device drives the carrying device to move in the object takeout state, the transport robot first detects a second driving current when the lifting device drives the carrying device to move in the object-taken-out state. Next, the transport robot calculates the second acting force according to the relationship between the acting force and the driving current.

Calculating the real-time weight information of the to-be-inventoried objects that are taken out in this way does not require the weighing device, thereby reducing costs and design difficulty.

In some embodiments, the goods in the to-be-inventoried objects are standard weight pieces. When the weight of the to-be-inventoried objects changes, the real-time weight information of the to-be-inventoried objects may alternatively be detected in the following way: When the goods in the to-be-inventoried objects are added or deducted by at least one, the real-time weight information of the to-be-inventoried objects is calculated according to preset standard weight information of goods, preset weight information of the to-be-inventoried objects, and the quantity of goods currently taken out/placed. For example, during first takeout, the preset standard weight information of the goods is 3 catties per goods, the preset weight information of the to-be-inventoried objects is 30 catties, and the quantity of goods currently taken out/placed is 4. Therefore, the real-time weight information of the to-be-inventoried objects is 30−3*4=18 catties. During second takeout, the quantity of goods currently taken out is 5. Therefore, the real-time weight information of the to-be-inventoried objects is 30−3*4−3*5=3 catties.

In conclusion, the transport robot may travel to the first position in the preset space according to a plurality of types of inventory information, and take out the to-be-inventoried objects corresponding to the first position.

S130: Processing the to-be-inventoried objects according to the real-time weight information.

In this embodiment, after the transport robot detects the real-time weight information of the to-be-inventoried objects, the transport robot may process the to-be-inventoried objects according to the real-time weight information.

For example, in some embodiments, the transport robot acquires a first comparison result of the real-time weight information and reference weight information, and processes the to-be-inventoried objects according to the first comparison result.

The reference weight information is weight information of the to-be-inventoried objects before the inventory. For example, before the inventory, the to-be-inventoried objects have been stored by the transport robot, that is, carried back to the first position of the warehousing shelving unit. At this time, the weight information of the to-be-inventoried objects at the first position has been pre-stored in the transport robot or the processing terminal, and the weight information of the to-be-inventoried objects at this time is the reference weight information. For example, the current weight information of the to-be-inventoried objects is 50 catties during storage. After ten catties of goods are taken out, the to-be-inventoried objects are stored again. At this time, the current weight information of the to-be-inventoried objects is 40 catties. The transport robot or the processing terminal stores the current weight information of 40 catties, and the current weight information of 40 catties is the reference weight information. During the inventory task, the transport robot takes out the to-be-inventoried objects by using the fork, and detects the current weight information of the to-be-inventoried objects by using the weighing device. The current weight information is the real-time weight information.

In some embodiments, the goods are standard weight pieces. The standard weight information of a single goods and the inventory information of the corresponding goods are pre-stored in the processing terminal or the transport robot. The inventory information includes a quantity of goods placed in the corresponding box. Weight information of the box before each takeout and placement may be calculated according to a quantity of the goods that are stored before takeout and placement and a net weight of the box having no goods placed therein. Therefore, the processing terminal may calculate the reference weight information according to the weight information of the box before takeout and placement, the standard weight information of each goods, and a quantity of goods currently taken out/placed.

In some embodiments, the reference weight information may be a determined weight value, or may be a range of thresholds. For example, the reference weight information is 50 catties, or 49 catties to 51 catties.

Since some other factors during the calculation of the weight affect a weighing result, the reference weight information provided in this embodiment of the present invention may be determined by a basic weight and a floating ratio. The basic weight is weight information detected when the transport robot transports the objects back to the warehousing shelving unit. The basic weight may alternatively be calculated in real time by the processing terminal or the transport robot based on an original weight of the to-be-inventoried objects according to a quantity of goods that have been previously placed into or taken out from the to-be-inventoried objects and the weight of each goods. That is to say, the basic weight may vary in real time.

The floating ratio is user-defined. Therefore, reference weight information=basic weight information±basic weight information*floating ratio. For example, the floating ratio is 2%. Assuming that the floating ratio is 2% and the basic weight is 50 catties, the reference weight information is 49 catties to 51 catties.

In some embodiments, setting of the floating ratio or determination of whether the to-be-inventoried objects are inventoried as abnormal herein may be performed according to industry or national standards. For example, referring to Table 1, Table 1 is a schematic table of allowed shortages of to-be-inventoried goods in the inventory task provided in this embodiment of the present invention. As shown in Table 1,

TABLE 1

| Marked net content of quantitatively packaged goods | Allowed shortage (T) | |
|---|---|---|
| by mass or volume (Q, g, or ml) | Q (%) | g or ml |
| 0-50 | 9 | — |
| 50-100 | — | 4.5 |
| 100-200 | 4.5 | — |
| 200-300 | — | 9 |
| 300-500 | 3 | — |
| 500-1000 | — | 15 |
| 1000-10000 | 1.5 | — |
| 10000-15000 | — | 150 |
| 15000-50000 | 1 | — |

It may be learned from Table 1 that when a weight of an object is between 0 and 50, an allowed shortage is 9%. In this case, a weight error within a range of 9% is allowed. Therefore, the floating ratio of the reference weight information or the estimated weight information may be set as follows: When the weight of the object is between 0 and 50, the floating ratio is 9%. Likewise, when the weight of the object is between 300 and 500, the floating ratio is 3%.

It may be understood that, those skilled in the art may alternatively determine the floating ratio according to specific service requirements and actual warehousing conditions, which is not limited to the methods illustrated herein.

In some embodiments, the first comparison result may be that the real-time weight information matches the reference weight information or that the real-time weight information does not match the reference weight information.

In some embodiments, the first comparison result is obtained by comparing the real-time weight information with the reference weight information by the transport robot.

In some embodiments, it may be further understood that the first comparison result is obtained by comparing the real-time weight information with the reference weight information by the processing terminal configured to communicate with the transport robot. For example, the transport robot sends the real-time weight information to the processing terminal, and the processing terminal compares the real-time weight information with the reference weight information, to obtain the first comparison result, and sends the first comparison result to the transport robot in data. Alternatively, the processing terminal sends the reference weight information to the transport robot, and the transport robot compares the real-time weight information with the reference weight information to obtain the first comparison result. In another example, the processing terminal compares the real-time weight information with the reference weight information to obtain the first comparison result. Herein, the processing terminal and the transport robot conform to the following: when no feedback information returned by the processing terminal has been received in a preset duration since a start time point at which the transport robot sends the real-time weight information to the processing terminal, the transport robot may consider "no feedback information returned by the processing terminal is received within the preset time period" as the first comparison result. The first comparison result herein may be that the real-time weight information matches the reference weight information or that the real-time weight information does not match the reference weight information. That is to say, when no feedback information returned by the processing terminal is received within the preset time period, the first comparison result herein may be that the real-time weight information does not match the reference weight information or that the real-time weight information matches the reference weight information. Therefore, the transport robot may manipulate the to-be-inventoried objects according to the first comparison result.

In conclusion, in this embodiment of the present invention, whether the transport robot compares the real-time weight information with the reference weight information or the processing terminal compares the real-time weight information with the reference weight information is not defined. In addition, the first comparison result may be expressed in different forms, for example, may be expressed in a form of data, or may be expressed in a form according to an agreed rule.

In some embodiments, during processing of the to-be-inventoried objects, when the first comparison result satisfies a first preset comparison condition, the transport robot places the to-be-inventoried objects back to the first position. For example, assuming that the reference weight information is a determined weight value, when the real-time weight information is equal to the reference weight information or within an error range of the reference weight information, the transport robot places the to-be-inventoried objects back to the first position. For example, the first position is a second warehousing position on a third layer of a warehousing shelving unit in row 3 column 4. The reference weight information (40 catties) of the to-be-inventoried objects at the first position before the inventory has been pre-stored in the transport robot or the processing terminal. During the inventory, the transport robot detects the real-time weight information (40 catties) of the to-be-inventoried objects that are taken out. Since the real-time weight information matches the reference weight information, the first comparison result satisfies the first preset comparison condition. Since no abnormality occurs in the to-be-inventoried objects, the transport robot returns, to the first position, the to-be-inventoried objects that are taken out. Alternatively, the detected real-time weight information of the to-be-inventoried objects that are taken out is 39 catties, and the error range of the reference weight information is ±1. That is to say, when the real-time weight information is between 39 catties and 41 catties (including 39 and 41), the first comparison result satisfies the first preset comparison condition. Since no abnormality occurs in the to-be-inventoried objects, the transport robot returns, to the first position, the to-be-inventoried objects that are taken out.

It may be further understood that, assuming that the reference weight information is a range of thresholds, when the real-time weight information falls within the range of the reference weight information, the first comparison result satisfies the first preset comparison condition, and the transport robot returns the to-be-inventoried objects to the first position.

In some embodiments, during processing of the to-be-inventoried objects by the transport robot, when the first comparison result does not satisfy the first preset comparison condition, the transport robot transports, to a first designated position, the to-be-inventoried objects that are taken out. For example, assuming that the reference weight information is a determined weight value, when the real-time weight information is not equal to the reference weight information or is not within the error range of the reference weight information, the first comparison result does not satisfy the first preset comparison condition. Therefore, the to-be-inventoried objects that are taken out are carried to the first designated position. The first designated position may be an inventory workstation or other user-defined positions. Since the real-time weight information does not match the reference weight information, it means that the to-be-inventoried objects are abnormal. For example, during daily takeout, objects of a quantity greater or less than a specified retrieval quantity are taken out. In another example, components in the stored to-be-inventoried objects are stolen. The above results in the real-time weight information of the to-be-inventoried objects being less or greater than the reference weight information.

In order to reconfirm the abnormal to-be-inventoried objects, the transport robot transports, to the inventory workstation, the to-be-inventoried objects that are taken out. Therefore, the inventory administrator may manually inventory the to-be-inventoried objects on the inventory workstation. For example, the inventory administrator counts a quantity, a weight, a model, and the like of the to-be-inventoried objects, to determine whether the quantity, the weight, and the model of the to-be-inventoried objects conform to various parameter information recorded in the processing terminal. After taking inventory of the to-be-inventoried objects, the inventory administrator calls the transport robot to travel to the inventory workstation, and instructs the transport robot to transport the to-be-inventoried objects back to the warehousing shelving unit. Alternatively, the inventory administrator places the to-be-inventoried objects on the storage unit of the transport robot, so that the transport robot caries the to-be-inventoried objects back to the warehousing shelving unit.

It may be further understood that, assuming that the reference weight information is a range of thresholds, when the real-time weight information does not fall within the range of the reference weight information, the first comparison result does not satisfy the first preset comparison condition, and the to-be-inventoried objects that are taken out are carried to the first designated position.

It may be further understood that, different from the above embodiments, in some embodiments, the transport robot includes at least one storage unit. During processing of the to-be-inventoried objects by the transport robot, when the first comparison result does not satisfy the first preset comparison condition, the transport robot places, in the storage unit of the robot, the to-be-inventoried objects that are taken out.

For example, the multi-layer rack includes a plurality of storage units. Each storage unit is located on a different layer. A plurality of storage units may be arranged on each layer. When the transport robot finds that a to-be-inventoried object B1 that is taken out is abnormal during the inventory, the transport robot places the to-be-inventoried object B1 in a storage unit C1. Next, when the transport robot finds that a to-be-inventoried object B2 that is taken out is abnormal during the subsequent inventory, the transport robot places the to-be-inventoried object B2 in a storage unit C2. Then, when the transport robot finds that a to-be-inventoried object B3 that is taken out is abnormal during the subsequent inventory, the transport robot places the to-be-inventoried object B3 in a storage unit C3. The storage unit C1, the storage unit C2, and the storage unit C3 may be located in the same layer, or any one, two, or all of the three storage units each may be located in a different layer. After the transport robot takes inventory of all of the to-be-inventoried objects, the transport robot transports the to-be-inventoried objects in all storage units back to the designated position. Therefore, the transport robot having such a structure is efficient in transporting the abnormal to-be-inventoried objects.

It may be further understood that, in some embodiments, when the transport robot includes a plurality of storage units, during the manipulating of to-be-inventoried objects by the transport robot, when the first comparison result does not satisfy the first preset comparison condition, the transport robot determines whether the quantity of the storage units having to-be-inventoried objects placed therein reaches a first threshold. If so, the transport robot transports, to the first designated position, the to-be-inventoried objects that are taken out.

For example, the multi-layer rack of the transport robot has a total of eight storage units. Five of the storage units have the to-be-inventoried objects placed therein, and three of the storage units have no to-be-inventoried objects placed therein. In some embodiments, the first threshold may be defined by a user according to service requirements. For example, the first threshold is used for describing "whether the quantity of the storage units having the to-be-inventoried objects placed therein reaches the first threshold". The first threshold is 5. Since the transport robot determines that five of the storage units have the to-be-inventoried objects placed therein, the transport robot transports, to the first designated position, the to-be-inventoried objects that are taken out.

Alternatively, the first threshold is used for describing "whether the quantity of the storage units having no to-be-inventoried objects placed therein reaches the first threshold". The first threshold is 3. Since 8−3=5, the transport robot determines that five of the storage units have the to-be-inventoried objects placed therein. Therefore, the transport robot transports, to the first designated position, the to-be-inventoried objects that are taken out.

In another example, the transport robot acquires storage status information of each of the plurality of storage units. The storage status information is used for indicating whether a storage unit has an object stored therein. If the storage unit has the object stored therein, the storage status of the storage unit is a loaded state. Correspondingly, the storage status information of the storage unit in the loaded state is loaded state information. If the storage unit has no object stored therein, the storage status of the storage unit is a no-load state. Correspondingly, the storage status information of the storage unit in the no-load state is no-load state information.

Next, the transport robot manipulates the to-be-inventoried objects according to the storage status information. For example, the transport robot calculates the total quantity of all storage units whose storage status information is no-load state information. For example, the multi-layer rack includes a total of eight storage units. Six of the storage units have objects stored therein, and two of the storage units have no objects stored therein. Therefore, the total quantity of all storage units whose storage status information is no-load state information is 2.

Next, the transport robot determines whether the total quantity is less than or equal to the first threshold. If so, the transport robot transports, to a second designated position, the to-be-inventoried objects that are currently taken out. If not, the transport robot places, in the storage units whose storage status information is no-load state information, the to-be-inventoried objects that are currently taken out. The first threshold may be defined by a user according to service requirements. For example, the first threshold is 2 or 3. The second designated position may be the inventory workstation or the like.

It may be understood that, in some embodiments, during the processing of the to-be-inventoried objects according to the storage status information by the transport robot, the transport robot calculates the total quantity of all storage units whose storage status information is the loaded state information, determines whether the total quantity is greater than or equal to the first threshold, and if so, transports, to the second designated position, the to-be-inventoried objects that are currently taken out, or; if not, places, in the storage units whose storage status information is the no-load state information, the to-be-inventoried objects that are currently taken out.

It may be further understood that, in some embodiments, the transport robot detects whether all of the plurality of storage units are all filled with objects, and if so, transports, to the second designated position, the to-be-inventoried objects that are currently taken out, or if not, places, in an empty storage unit, a to-be-inventoried object that is currently taken out. For example, the transport robot has storage units C1, C2, and C3 located in different layers. The storage units C1, C2, and C3 are respectively filled with the abnormal to-be-inventoried objects B1, B2, and B3. When the transport robot finds an abnormal to-be-inventoried object B4 during the inventory, the transport robot takes the to-be-inventoried object B4 by using the carrying device, transports the to-be-inventoried objects B1, B2, and B3, and travels to the designated position.

In another example, the transport robot has storage units C1, C2, C3, and C4 located in different layers. The storage units C1, C2, and C3 are respectively filled with abnormal to-be-inventoried objects B1, B2, and B3, the storage unit C4 has no to-be-inventoried object placed therein, and the state of the storage unit C4 is no-load state at this time. When the transport robot finds the abnormal to-be-inventoried object B4 during the inventory, the transport robot transports the to-be-inventoried object B4 back to the storage unit C4 for placement.

Based on the above, since the transport robot can automatically take inventory of the objects, the inventory method provided in this embodiment of the present invention has relatively high inventory efficiency.

In order to describe in detail the inventory method provided in the embodiments of the present invention, the inventory method is described in detail below by using one of the embodiments. It may be understood that the description herein is neither intended to limit the protection scope of the present invention, nor intended to make any limitation on implementation of other embodiments of the present invention, and is merely used for assisting understanding of the embodiments of the present invention. The inventory process is as follows.

1. A system data clerk/inventory administrator formulates an inventory plan according to a set rule.
2. The processing terminal delivers the inventory information to the transport robot at a set time point.
3. The transport robot travels to a first position at corresponding warehousing positions according to the inventory information.
4. The transport robot obtains corresponding objects.
5. The transport robot transports the to-be-inventoried object to the fork, and weighs the to-be-inventoried object after standing still for five seconds, to obtain real-time weight information of the to-be-inventoried objects.
6. If the real-time weight information of the to-be-inventoried objects is within a set allowed tolerance range, the real-time weight information of the to-be-inventoried objects is fed back to the processing terminal.
7. The transport robot stores again the to-be-inventoried objects that have been inventoried at an original storage position by using the fork.
8. If the real-time weight information of the to-be-inventoried objects is not within the set allowed tolerance range, the to-be-inventoried objects are placed in the multi-layer rack of the transport robot. If the multi-layer rack is not arranged on the transport robot, the to-be-inventoried objects may be carried to a designated position for manual inventory. For example, the transport robot places the to-be-inventoried objects on an goods-rack of the inventory workstation for review by the inventory administrator.
9. The inventory administrator reviews the to-be-inventoried objects, registers an inventory quantity, and calls the transport robot to the inventory workstation.
10. The inventory administrator places the to-be-inventoried objects that have been inventoried into the multi-layer rack of the transport robot, and binds the to-be-inventoried objects to the respective layers they are placed on in the processing terminal.
11. The transport robot transports the to-be-inventoried objects to the corresponding warehousing positions for storage.
12. When the storage units (four storage units) in the multi-layer rack of the transport robot are full, and when a fifth to-be-inventoried object is substandard, the transport robot is required to load all substandard to-be-inventoried objects to the inventory workstation. It may be understood that, during unmanned inventory tasks at night, the transport robot or the processing terminal may first record abnormal to-be-inventoried objects found during the inventory, generate an abnormal inventory report, and then wait for manual review of the abnormal to-be-inventoried objects according to the abnormal inventory report, and correct the inventory according to a relevant process.
13. The transport robot travels to a next warehousing position to continue the inventory.

In some embodiments, the transport robot may realize inventory of a box during daily takeout and placement of goods. For example, the transport robot detects and records weight information of objects during each time the goods are put into and out of the warehouse. For example, the transport robot or the processing terminal records the weight information of a box A during the first time it is put into the warehouse. Therefore, first storage weight information of the box A is stored in the transport robot or the processing terminal. Alternatively, when goods are put into the warehouse, the system pre-records a standard weight of each kind of goods/and standard weight information of the box A. Each SKU of goods has same attribute such as a brand, a model, and a color. If any of the attributes is different from that of other goods, the goods have a different SKU. When ten goods having the same SKU are stored in the box A when the goods are put into the warehouse, the total weight of the box during the goods being put into the warehouse is the sum of the standard weight of the box A and weights of the ten goods having the SKU.

The transport robot detects the weight information of the box when goods are put into and out of the warehouse after each takeout or placement of goods Thus, after a plurality of times of subsequent takeout and placement of goods, the transport robot or the processing terminal predicts some possible errors according to the first storage weight information and the weight information after the plurality of times of takeout and placement of goods, generates an abnormal inventory report, and timely feeds back the abnormal inventory report to a competent department, so that the competent department plans cyclic inventory and error elimination.

In this way, error proof checking can be performed physically. In order to ensure smooth operation of the normal warehousing task, during the daily inventory task, the transport robot or the processing terminal only needs to record and form an abnormal inventory report and regularly (every 1-2 hours) refresh the abnormal inventory report and submit the report to a supervisor on duty without interrupting the normal warehousing task. The supervisor on duty plans solutions according to a warehouse operation status for the abnormalities in the daily inventory.

In some embodiments, a box where a preset quantity of goods is taken out or placed is denoted as a current box. For example, ten goods are placed in the box. The processing terminal sends a first retrieval instruction to the transport robot, instructing to take out three goods from the box. Therefore, the transport robot transports the box to a sorting station according to the first retrieval instruction, and the retrieval personnel take out three goods from the box. After the three goods are taken out, only seven goods remain in the box. The box including the seven goods is the current box, and the weight of the current box is a sum of the weight of the box and the weight of the seven goods. The transport robot stores the box including the seven goods again, and records the weight information of the box including the seven goods, or uploads the weight information of the box including the seven goods to the processing terminal.

Next, the processing terminal sends a second retrieval instruction to the transport robot, instructing to take out two goods from the box. Therefore, the transport robot transports the box including the seven goods to the sorting table according to the second retrieval instruction, and the retrieval personnel take out two goods from the box. After the two goods are taken out, only five goods remain in the box. The box including the five goods is the current box, and the weight of the current box is a sum of the weight of the box and the weight of the five goods. The transport robot stores the box including the five goods again, and records the weight information of the box including the five goods, or uploads the weight information of the box including the five goods to the processing terminal.

Similarly, the weight information of the current box is continuously calculated.

Likewise, the processing terminal delivers a placement instruction to the transport robot, instructing to place four goods into the box. Therefore, the transport robot transports the box including ten goods to a retrieval station according to the placement instruction, and placement personnel place four goods into the box. After the four goods are placed, a total of 14 goods exist in the box. The box including the 14 goods is the current box.

It may be understood that, takeout/placement may be performed once or more than twice. Therefore, the weight information of the current box is not constant, and is determined after a preset quantity of goods are taken out/placed.

Figure 14:
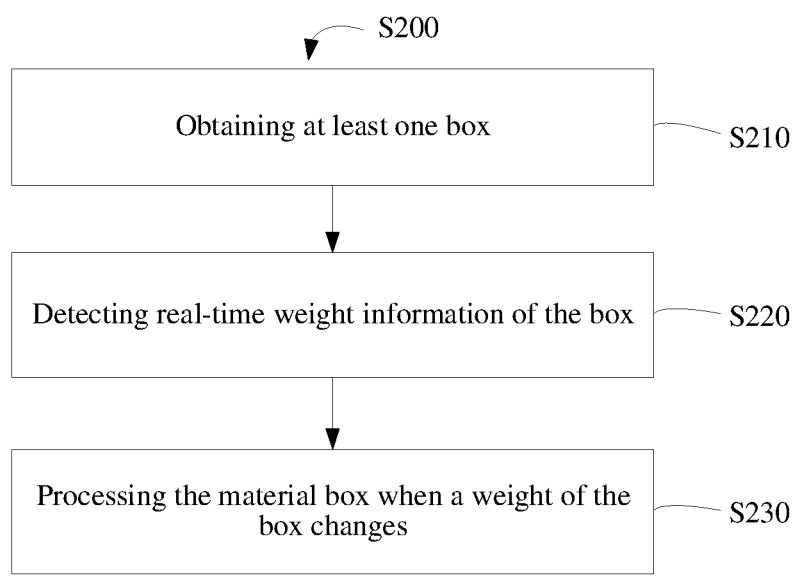
FIG. 14 is another schematic flowchart of the inventory method based on the transport robot according to an embodiment of the present invention.

In some embodiments, an embodiment of the present invention provides a daily inventory method based on the transport robot. Referring to FIG. 14, the inventory method S200 based on the transport robot includes the following steps.

S210: obtaining at least one box.

In this embodiment, the box herein may be understood as a box carried by the transport robot to other positions from a designated position. For example, the transport robot transports the box from the sorting station to a designated warehousing shelving unit. Alternatively, the box herein may be understood as a box carried by the transport robot to the designated position from the other positions. For example, the transport robot receives the retrieval instruction, takes out the specified box from the designated warehousing shelving unit according to the retrieval instruction, and transports the box from the warehousing shelving unit to the designated position, such as the sorting station. It may be further understood that the box herein may be explained as a box in other service scenarios.

The box may be a box made of any material, such as paper, plastic, or metal. In addition, the box may be constructed into any suitable shape, such as a cube, a cuboid, or a cylinder. It may be understood that the box may be constructed into a shape facilitating carrying by the transport robot.

In this embodiment, in a daily process, the transport robot may obtain one box or more than two boxes, so that an operator can perform other service plans on the one box or the more than two boxes.

S220: Detecting real-time weight information of the box.

In this embodiment, the operator or a warehousing automatic device performs related operations such as sorting or storage on the box. Therefore, the weight of the box changes. For example, the box is carried to the sorting station. At the sorting station, the operator or a robotic arm automatically takes out one or more goods from the box, or automatically places one or more goods into the box. The warehousing automatic device may be understood as the robotic arm or other automatic grabbing devices.

In this embodiment, the real-time weight information of the box may be detected at various time points. For example, the transport robot may detect the real-time weight information of the box during carrying of the box from the warehousing shelving unit to the sorting station by the transport robot, on the warehousing shelving unit, on the sorting station, during carrying of the box from the sorting station to the warehousing shelving unit, or during carrying of the box from another storage position A to another storage position B.

In this embodiment, the real-time weight information of the box is current weight information of the box. For example, during storage of the box, the current weight information is 50 catties. After ten catties of goods are taken out, the box is stored again. At this time, the current weight information of the box is 40 catties. In this case, during a daily inventory task, the transport robot takes out the box, and after the box is taken out, a weight detection device arranged on the carrying device can detect that the current weight information of the box is 40 catties. That is to say, the current weight information of 40 catties is the real-time weight information.

It may be understood that, in addition to arranging the weight detection device on the fork, the weight detection device may alternatively be arranged at any suitable position in the transport robot to detect the weight of the box. For example, the weight detection device may be arranged on the chassis or the storage rack of the transport robot or at other suitable positions. In another example, the transport robot includes at least one storage unit. The weight detection device is arranged on the at least one storage unit to detect the real-time weight information of the box.

In some embodiments, the weight detection device may be any suitable weighing sensor.

It may be further understood that, in addition to detecting the real-time weight information of the box by means of the weight detection device, the transport robot may alternatively detect the real-time weight information of the box by means of other proper technical means.

For example, as described above, the carrying device and the lifting device are arranged on the transport robot, and the lifting device is configured to drive the carrying device to move and to take out the box. When detecting the real-time weight information of the box that is taken out, the transport robot first calculates a first acting force when the lifting device drives the carrying device to move in a no-load state. Next, the transport robot calculates a second acting force when the lifting device drives the carrying device to move in an object-taken-out state. Finally, the transport robot calculates, according to the first acting force and the second acting force, the real-time weight information of the box that is taken out. The no-load state is a state in which the transport robot does not take out the objects, that is, a state in which the carrying device does not take out the objects.

In some embodiments, the movement herein may be a linear movement or a curvilinear movement, and the curvilinear movement includes a circular movement or the like. The linear movement includes a uniform linear movement or an accelerated linear movement. The uniform linear movement may be a uniform linear ascending movement or a uniform linear descending movement, and the accelerated linear movement may be an accelerated linear ascending movement or an accelerated linear descending movement.

In this embodiment, a working principle of calculating the real-time weight information of the box that is taken out is described in detail by using the uniform linear descending movement as an example.

First, when the carrying device of the transport robot does not catch any objects, the transport robot operates in the no-load state. The lifting device of the transport robot drives the carrying device to perform the uniform linear descending movement in the no-load state. At this time, the transport robot detects the acting force required by the lifting device to drive the carrying device to perform the uniform linear descending movement in the no-load state, and sets the acting force as a first acting force $F_1$.

Next, when the carrying device of the transport robot takes out an object, the transport robot operates in the object-taken-out state. The lifting device of the transport robot drives the carrying device to perform the uniform linear descending movement in the object-taken-out state. At this time, the transport robot detects the acting force required by the lifting device to drive the carrying device to perform the uniform linear descending movement in the object takeout state, and sets the acting force as a second acting force $F_2$. According to the Newton's laws of motion, $F_2 = F_1 + G_1$, where $G_1$ is a gravity of the box. Since $F_1$ and $F_2$ are known quantities, $G_1 = F_2 - F_1$ can be calculated.

In some embodiments, a working principle of calculating the real-time weight information of the box that is taken out is described in detail by using the accelerated linear descending movement as an example.

First, when the carrying device of the transport robot does not catch any objects, the transport robot operates in the no-load state. The lifting device of the transport robot drives the carrying device to perform the accelerated linear descending movement in the no-load state. At this time, the transport robot detects the acting force required by the lifting device to drive the carrying device to perform the accelerated linear descending movement in the no-load state, and sets the acting force as a first acting force $S_1$. $S_1 = P_1 - M_1 * a_1 = M_1 * (g - a_1)$, where $P_1$ is a gravity of the carrying device, $M_1$ is a mass of the carrying device, g is a gravitational constant, and $a_1$ is an acceleration of the carrying device. The acceleration $a_1$ of the carrying device may be collected by an accelerometer arranged in the carrying device.

Next, when the carrying device of the transport robot takes out an object, the transport robot operates in the object-taken-out state. The lifting device of the transport robot drives the carrying device to perform the accelerated linear descending movement in the object-taken-out state. At this time, the transport robot detects the acting force required by the lifting device to drive the carrying device to perform the accelerated linear descending movement in the object takeout state, and sets the acting force as a second acting force $S_2$. According to the Newton's laws of motion, $S_2 = (P_1 + P_2) - (M_1 + M_2) * a_2 = M_1 * (g - a_1) + M_2 * (g - a_2)$, where $P_2$ is a gravity of the box, and $M_2$ is a mass of the box. Since $S_1$, $S_2$, $a_1$, and $a_2$ are known quantities, the real-time weight information of the box that is taken out may be calculated according to the above equation.

In some embodiments, the lifting device is composed of a motor, a transmission structure, and a lifting plate. The motor outputs a driving force to the transmission structure, and the driving force is used for driving the lifting plate to rise or fall. When the lifting plate is connected to the carrying device, the motor can drive the lifting plate through the transmission structure and thereby drive the carrying device to rise or fall. Since the driving force outputted by a driving motor and a driving current of the driving motor are related, there is a functional relationship between them.

Therefore, in some embodiments, during calculation of the first acting force when the lifting device drives the carrying device to move in the no-load state, the transport robot first detects a first driving current when the lifting device drives the carrying device to move in the no-load state. Next, the transport robot calculates the first acting force according to the relationship between the acting force and the driving current. For example, the first acting force $F1 = k*I$, where k is a proportional constant between the acting force and the driving current, and I is the driving current. When the driving current I is detected and the proportional constant k is obtained, the first acting force F1 can be obtained.

Therefore, in some embodiments, during calculation of the second acting force when the lifting device drives the carrying device to move in the object-taken-out state, the transport robot first detects a second driving current when the lifting device drives the carrying device to move in the object takeout state. Next, the transport robot calculates the second acting force according to the relationship between the acting force and the driving current.

Calculating the real-time weight information of the box that is taken out in this way does not require the weight detection device, thereby reducing costs and design difficulty.

In some embodiments, the goods in the box are standard weight pieces. As described above, for an SKU, information of a corresponding single goods' standard weight is recorded when the goods are put into the warehouse. When the weight of the box changes, the real-time weight information of the box may alternatively be detected in the following way. When the goods in the box are added or deducted by at least one, the real-time weight information of the box is calculated according to preset standard weight information of goods, preset weight information of the box, and a quantity of goods currently taken out/placed. For example, when the goods are taken out for the first time, the preset standard weight information of goods is 3 catties per goods, the total weight information of the box before the goods are currently taken out is 30 catties, and the quantity of goods currently taken out is 4. Therefore, the real-time weight information of the box is 30−3*4=18 catties.

In some embodiments, after obtaining the at least one box, the transport robot transports the box to the first designated position. After operations (such as sorting) related to the box are completed at the first designated position, the transport robot transports the box from the first designated position to the second designated position. For example, the transport robot transports the box from the sorting station to a warehousing shelving unit. The transport robot detects whether the weight of the box changes according to the real-time weight information when the box is at the first designated position, when the box is carried to the first designated position, when the box is at the second designated position, or when the box is carried from the first designated position to the second designated position.

For example, after carrying the box from a warehousing shelving unit to a sorting station for takeout/placement of goods, the transport robot detects, at the sorting station, whether the weight of the box changes. Alternatively, when the box is carried from the warehousing shelving unit to the sorting station, it is detected whether the weight of the box changes, and a detection result is reported to the processing terminal. Alternatively, after goods are taken out from or placed on the box, the box is required to be carried back to the warehousing shelving unit. After the box is carried from the sorting station to the warehousing shelving unit, the transport robot detects, on the warehousing shelving unit, whether the weight of the box changes. Alternatively, when the box is carried from the sorting station to the warehousing shelving unit, the transport robot detects, on the warehousing shelving unit, whether the weight of the box changes, and reports the detection result to the processing terminal.

It may be understood that the first designated position is different from the second designated position, and the first designated position or the second designated position may be any suitable position. For example, the first designated position is the sorting station or the workstation, and the second designated position is the shelving unit or other positions.

S230: Processing the box when a weight of the box changes.

In this embodiment, after the transport robot detects the real-time weight information of the box, the transport robot may process the box according to the real-time weight information. For example, the transport robot transports the box to the second designated position. In another example, the transport robot transports the box to other positions such as a loading area. The second designated position may be a position where the box is placed on the warehousing shelving unit or other suitable positions. When the box is carried to the warehousing shelving unit, the transport robot may detect the real-time weight information of the box for the daily inventory of goods, thereby improving inventory efficiency and preventing problems related to the inventory in time.

In some embodiments, the transport robot may further acquire a first comparison result of the real-time weight information of the box and estimated weight information when the box is at the first designated position, before the box is at the first designated position, the box is at the second designated position, or when the box is carried from the first designated position to the second designated position, and determines whether the first comparison result satisfies a first preset comparison condition. If not, the transport robot transports the box to a third designated position. The third designated position is the sorting station, an abnormal goods operating workstation, or the like.

In this embodiment, the estimated weight information is weight information calculated by the transport robot or the processing terminal according to the first storage/retrieval weight information after a plurality of times of takeout and placement of goods. For example, the processing terminal records the information of the first storage weight of a box D1, and records the quantity of goods of the current box before retrieval and the quantity of goods taken out each time, when sending a retrieval instruction to the transport robot each time. The processing terminal pre-stores the weight of a single goods and information of the current box's standard weight. For example, the total weight information of the current box during first storage is 50 catties, the standard weight information of the box is two catties, the quantity of goods in the current box before takeout is 10, the quantity of goods currently taken out is 4, and the preset weight information of the goods is 3 catties per goods. Therefore, the estimated weight information of the box is 2+(10−4)*3=20 catties.

Alternatively, the processing terminal calculates the weight of the goods taken out for the first time as 5 catties. Therefore, for a first retrieval stage, the estimated weight information is 50−5=45 catties. The weight of goods taken out for the second time is 6 catties. Therefore, for a second retrieval stage, the estimated weight information is 50−5−6=39 catties. For a third retrieval stage, the estimated weight information is 50−5−6−9=30 catties.

It may be understood that, takeout/placement may be performed once or more than twice. Therefore, the estimated weight information is not constant, and is determined after a preset quantity of goods are taken out/placed.

In some embodiments, as described above, the estimated weight information may be a determined weight value, or may be a range of thresholds. For example, the estimated weight information is 50 catties, or 49 catties to 51 catties.

Since some other factors during the calculation of the weight may affect the result of weighing, the estimated weight information provided in this embodiment of the present invention may be determined by a basic reference weight and a floating ratio. The basic reference weight is weight information detected when the transport robot transports the box back to the warehousing shelving unit. The basic reference weight may alternatively be calculated in real time by the processing terminal or the transport robot based on an original weight of the box according to the quantity of goods that have been previously placed into or taken out from the box and the weight of each goods. That is to say, the basic reference weight may vary in real time.

The floating ratio is user-defined. Therefore, estimated weight information=basic reference weight information±basic reference weight information*floating ratio. For example, the floating ratio is 2%. Assuming that the floating ratio is 2% and the basic reference weight is 50 catties, the estimated weight information is 49 catties to 51 catties.

In some embodiments, the first comparison result is obtained by comparing the weight information of the current box with the estimated weight information by the transport robot.

In some embodiments, it may be further understood that the first comparison result is obtained by comparing the weight information of the current box with the estimated weight information by the processing terminal configured to communicate with the transport robot. For example, the transport robot sends the weight information of the current box to the processing terminal, and the processing terminal compares the weight information of the current box with the estimated weight information to obtain the first comparison result, and transmits a first comparison result to the transport robot in a form of data. Alternatively, the processing terminal sends the estimated weight information to the transport robot, and the transport robot compares the weight information of the current box with the estimated weight information to obtain the first comparison result.

In some embodiments, the first comparison result may be that the weight information of the current box matches the estimated weight information or that the weight information of the current box does not match the estimated weight information.

If the weight information of the current box does not match the estimated weight information, a daily inventory report is generated. The daily inventory report includes the daily inventory information of the current box. For example, the daily inventory information includes ID information of the current box, the current weight information, the estimated weight information, a weight error, a goods name, a model, and the like. The daily inventory report may include daily inventory information of all abnormal boxes found by the transport robot during the inventory, and may further include a graph drawn from the daily inventory information.

In some embodiments, the goods are standard weight pieces, such as standard power banks, tissues, or the like. It may be further understood that the goods may alternatively be understood as commodities packaged with standard packaging materials.

Generally, a same kind of goods use turnover boxes or cartons of a same standard, and same goods shall not have different packaging forms or volumes.

In some embodiments, in the processing terminal, standard weight information of a single goods is preset, and inventory information corresponding to a corresponding box is stored. The inventory information includes the quantity of goods placed in the corresponding box. Weight information of the box before each takeout and placement may be calculated according to the quantity of the goods that are stored before takeout and placement and the net weight of the box having no goods placed therein. Therefore, the processing terminal may calculate the estimated weight information according to the weight information of the box before takeout and placement, the standard weight information of each goods, and the quantity of goods currently taken out/placed.

For example, a box before takeout/placement of a preset quantity of goods is denoted as an inventory box. The estimated weight information is calculated based on weight information of the inventory box, the weight information of each goods, and the quantity of the goods to be taken out. The weight information of a box E1 when the box is put into the warehouse for the first time is 50 catties. That is to say, since goods are not taken out from/placed in the box E1 since the box E1 is put into the warehouse for the first time, the box E1 is a put-in box. Ten goods are placed in the put-in box. Each goods is five catties, and each goods uses a standard specification. The processing terminal sends a third retrieval instruction to the transport robot, instructing to take out three goods from the inventory box. For the retrieval stage, the estimated weight information is 50−5*3=35 catties. Next, the processing terminal sends a fourth retrieval instruction to the transport robot, instructing to take out four goods from the put-in box. For the retrieval stage, the estimated weight information is 50−5*(3+4)=15 catties.

In conclusion, by means of the daily inventory method, shortage of weights of the objects in the warehouse can be found timely, and a warehousing status of the warehouse can be learned timely, thereby preventing various problems related to warehousing.

In order to describe in detail the daily inventory method provided in the embodiments of the present invention, the inventory method is described in detail below by using one of the embodiments. It may be understood that the description herein is neither intended to limit the protection scope of the present invention, nor intended to make any limitation on implementation of other embodiments of the present invention, and is merely used for assisting understanding of the embodiments of the present invention. The daily inventory process is as follows.

1. When a box is put into the warehouse for the first time, weight information corresponding to an SKU of goods placed in the box, goods quantity information, box weight information, and/or total box weight information are bound.
2. Each time receiving a retrieval instruction, the transport robot records the quantity of to-be-taken-out goods and the total remaining weight of the box. For example, after a corresponding quantity of goods are taken out from the box, the transport robot records the total remaining weight of the box, and uploads the recorded information to the processing terminal.
3. The goods information and the box information are uploaded to the processing terminal.
4. The processing terminal performs data analysis according to the uploaded information, and verifies the quantity of goods remaining in the box. For example, when the box is put into the warehouse for the first time, the processing terminal pre-stores the weight information of the put-in box and the weight information of each goods. Each time the goods are taken out, the put-in box changes in goods quantity and weight accordingly. If the processing terminal analyzes that the weight information of the current box during the takeout does not match the estimated weight information, the processing terminal determines that the current box is abnormal.

5. The processing terminal generates a daily inventory report based on abnormal objects found during the inventory each half day, and feeds back the daily inventory report to the warehouse supervisor or system maintenance data personnel.

6. The inventory administrator plans daily cyclic inventory for each box according to the daily inventory report.

It should be noted that, in each of the above embodiments, there is not necessarily a specific sequence between the steps. A person of ordinary skill in the art may understand according to the description of the embodiments of the present application that in a different embodiment, the above steps may be performed in a different order, that is, the steps may be performed in parallel, transposed, or the like.

Figure 15:
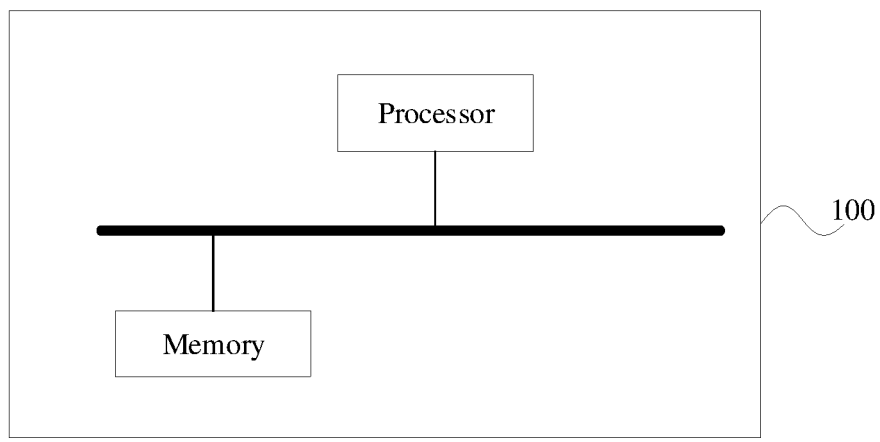
FIG. 15 is a circuit principle block diagram of a transport robot according to an embodiment of the present invention.

FIG. 15 is a circuit block diagram of a transport robot according to an embodiment of the present invention. As shown in FIG. 15, the transport robot includes one or more processors and a memory. In FIG. 15, one processor is used as an example.

The processor may be connected to the memory by a bus or in other manners. In FIG. 5, the processor is connected to the memory by a bus, for example.

The memory is a non-volatile computer-readable storage medium, and may be configured to store non-volatile software programs, non-volatile computer-executable programs, and modules, such as the program instructions/modules corresponding to the inventory method based on the transport robot in the embodiments of the present invention. The processor executes various functional applications and data processing of the inventory device based on the transport robot by running the non-volatile software programs, instructions, and the modules stored in the memory, that is, implements the inventory method based on the transport robot in the above method embodiments and the functions of the modules in the above device embodiments.

The memory may include a high-speed random access memory, and may further include a non-volatile memory, such as at least one magnetic disk storage device, a flash storage device, or other non-volatile solid-state storage devices. In some embodiments, the memory may optionally include memories remotely disposed relative to the processor. The remote memories may be connected to the processor by a network. Examples of the above network include, but are not limited to, the Internet, an intranet, a local area network, a mobile communication network, and a combination thereof.

The program instructions/modules are stored in the memory. When the program instructions/modules are executed by one or more processors, the inventory method based on the transport robot in any of the above method embodiments is performed.

The transport robot in this embodiment of the present invention exists in various forms, and performs the steps described above.

An embodiment of the disclosure further provides a non-volatile computer storage medium storing computer-executable instructions. The computer-executable instructions, when executed by one or more processors, for example, the processor in FIG. 5, cause the one or more processors to perform the inventory method based on the transport robot in any of the above method embodiments.

An embodiment of the present invention further provides a computer program product. The computer program product includes a computer program stored in a non-volatile computer-readable storage medium. The computer program includes program instructions. The program instructions, when executed by the transport robot, cause the transport robot to perform any of the inventory methods based on the transport robot.

Since the transport robot can automatically inventory the objects, the inventory method provided in the embodiments of the present invention has relatively high inventory efficiency.

The foregoing described apparatus or device embodiments are merely examples. The unit modules described as separate parts may or may not be physically separate, and the parts displayed as module units may or may not be physical units, may be located in one position, or may be distributed on a plurality of network module units. A part or all of the modules may be selected according to actual requirements to achieve the objectives of the solutions of the embodiments of the present invention.

By means of the description of the above implementations, those skilled in the art can clearly understand that the implementations may be implemented by means of software and a general hardware platform, or definitely, may be implemented by means of hardware. Based on the understanding, the above technical solutions, in essence, or a part contributing to the related art may be embodied in a form of a software product. The computer software product may be stored in a computer-readable storage medium, such as a ROM/RAM, a magnetic disk, or an optical disk, and includes a plurality of instructions to cause a computer device (which may be a personal computer, a processing terminal, a network device, or the like) to perform the methods in all or some of the embodiments.

Those skilled in the art may understand that all or some of the steps of the foregoing method embodiments may be implemented by a program instructing relevant hardware. The program may be stored in a computer-readable storage medium. When the program is executed, steps of the method embodiments are performed. The foregoing storage medium includes: a medium such as a ROM, a RAM, a magnetic disk, or an optical disc that can store program code.

Finally, it should be noted that: the foregoing embodiments are merely intended for describing the technical solutions of the present invention rather than limiting the present invention. Although the present invention has been described in detail with reference to the foregoing embodiments, those of ordinary skill in the art should understand that they can still make modifications to the technical solutions recited in the above embodiments or make equivalent replacements to a part or all of the technical features thereof; and these modifications or replacements will not cause the essence of corresponding technical solutions to depart from the scope of the technical solutions in the embodiments of the present invention.

What is claimed is:

1. A transport robot, comprising a chassis, a plurality of storage units, and a carrying device, wherein the plurality of storage units and the carrying device are supported by the chassis;

wherein the carrying device comprises:
a bracket;
a tray, mounted to the bracket and configured to place goods;
a weight detection device, configured to detect a weight of the goods placed on the tray; and a retractable arm assembly, configured to push the goods placed on the tray out of the tray or pull the goods to the tray;

wherein the transport robot is configured to:

acquire inventory information, and travel to a first position in the preset space according to the inventory information;

detect real-time weight information of to-be-inventoried objects corresponding to the first position; and manipulate the to-be-inventoried objects according to the real-time weight information;

wherein when the transport robot manipulates the to-be-inventoried objects according to the real-time weight information, the transport robot is configured to: acquire a first comparison result of the real-time weight information and reference weight information; and manipulate the to-be-inventoried objects according to the first comparison result;

wherein when the transport robot manipulates the to-be-inventoried objects according to the first comparison result, the transport robot is configured to: return the to-be-inventoried objects to the first position when the first comparison result satisfies a first preset comparison condition; and place, in storage units of the robot, the to-be-inventoried objects that are taken out, when the first comparison result does not satisfy the first preset comparison condition;

wherein when the transport robot places the to-be-inventoried objects that are taken out in storage units of the robot, the transport robot is configured to: determine whether a quantity of the storage units having the to-be-inventoried objects placed therein reaches a first threshold when the first comparison result does not satisfy the first preset comparison condition, and if so, carry, to a first designated position, the to-be-inventoried objects that are taken out.

2. The transport robot according to claim 1, further comprising a lifting mechanism, wherein the lifting mechanism is configured to drive the carrying device to rise or fall.

3. The transport robot according to claim 1, wherein the retractable arm assembly comprises a retractable arm, a fixed push rod, and a movable push rod;

the retractable arm is extendable along a direction parallel to the tray;

the fixed push rod and the movable push rod are both mounted to the retractable arm, the fixed push rod and the movable push rod extend with the retractable arm when the retractable arm extends, the movable push rod is located in an extending direction of the fixed push rod along the retractable arm, and the movable push rod is receivable in the retractable arm; and the fixed push rod is configured to push the goods out of the tray when the retractable arm extends out and the movable push rod is configured to pull the goods to the tray when the retractable arm retracts.

4. The transport robot according to claim 1, wherein in a direction perpendicular to the extending direction of the retractable arm and parallel to the tray, the retractable arm is located on a side of the tray; and the fixed push rod and the movable push rod are located on a same side of the retractable arm as the tray.

5. The transport robot according to claim 1, comprising a fork and a rotary mechanism, wherein the fork comprises the tray, the weight detection device, and the retractable arm assembly; and the rotary mechanism is configured to drive the fork to rotate relative to the bracket about an axis perpendicular to the tray.

6. The transport robot according to claim 1, wherein the weight detection device is a pressure sensor.

7. The transport robot according to claim 1, wherein the tray has an upper surface and a lower surface, the upper surface of the tray is configured to place the goods, and the weight detection device is located on the lower surface of the tray.

8. The transport robot according to claim 1, wherein the weight detection device is located in a center of the tray.

9. The transport robot according to claim 1, wherein a plurality of weight detection devices are arranged, and the plurality of weight detection devices are evenly distributed in a plane parallel to the tray and are configured to jointly detect the weight of the goods placed on the tray.

10. The transport robot according to claim 9, wherein four weight detection devices are arranged, and the four weight detection devices are distributed in a rectangular shape.

11. An inventory method applicable to a transport robot, wherein the transport robot is configured to travel in a preset space and take out and place an object located in the preset space, the method comprising:

acquiring inventory information, and traveling to a first position in the preset space according to the inventory information;

detecting real-time weight information of to-be-inventoried objects corresponding to the first position; and manipulating the to-be-inventoried objects according to the real-time weight information;

wherein the manipulating the to-be-inventoried objects according to the real-time weight information comprises: acquiring a first comparison result of the real-time weight information and reference weight information; and manipulating the to-be-inventoried objects according to the first comparison result;

wherein the transport robot comprises a plurality of storage units, and the manipulating the to-be-inventoried objects according to the first comparison result comprises: returning the to-be-inventoried objects to the first position when the first comparison result satisfies a first preset comparison condition; and placing, in the storage units of the robot, the to-be-inventoried objects that are taken out, when the first comparison result does not satisfy the first preset comparison condition;

wherein the placing, in storage units of the robot, the to-be-inventoried objects that are taken out, when the first comparison result does not satisfy the first preset comparison condition specifically comprises: determining whether a quantity of the storage units having the to-be-inventoried objects placed therein reaches a first threshold when the first comparison result does not satisfy the first preset comparison condition, and if so, carrying, to a first designated position, the to-be-inventoried objects that are taken out.

12. The method according to claim 11, wherein detecting real-time weight information of to-be-inventoried objects corresponding to the first position comprises:

taking out the to-be-inventoried objects corresponding to the first position; and detecting the real-time weight information of the to-be-inventoried objects that are taken out.

13. The method according to claim 12, wherein detecting the real-time weight information of the to-be-inventoried objects that are taken out comprises:

calculating a first acting force when a lifting device drives a carrying device to move in a no-load state;

calculating a second acting force when the lifting device drives the carrying device to move after the to-be-inventoried objects are taken out; and calculating, according to the first acting force and the second acting force, the real-time weight information of the to-be-inventoried objects that are taken out.

14. The method according to claim 11, wherein the inventory information is delivered to the transport robot by a processing terminal configured to communicate with the transport robot; or the inventory information is automatically generated by the transport robot.

\* \* \* \* \*